US012118297B2

(12) United States Patent
Tsukikawa

(10) Patent No.: US 12,118,297 B2
(45) Date of Patent: Oct. 15, 2024

(54) INFORMATION PROCESSING APPARATUS

(71) Applicant: CANON KABUSHIKI KAISHA, Tokyo (JP)

(72) Inventor: Takenori Tsukikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 17/343,547

(22) Filed: Jun. 9, 2021

(65) Prior Publication Data

US 2021/0390250 A1 Dec. 16, 2021

(30) Foreign Application Priority Data

Jun. 15, 2020 (JP) .................................. 2020-103338
Jun. 15, 2020 (JP) .................................. 2020-103339

(51) Int. Cl.
| | |
|---|---|
| *G06F 40/169* | (2020.01) |
| *G06F 40/279* | (2020.01) |
| *G06N 20/00* | (2019.01) |
| *G08B 21/18* | (2006.01) |

(52) U.S. Cl.
CPC .......... *G06F 40/169* (2020.01); *G06F 40/279* (2020.01); *G06N 20/00* (2019.01); *G08B 21/182* (2013.01)

(58) Field of Classification Search
None
See application file for complete search history.

(56) References Cited

U.S. PATENT DOCUMENTS

| | | | | |
|---|---|---|---|---|
| 10,382,300 | B2* | 8/2019 | Ellenbogen | G06N 5/022 |
| 10,977,518 | B1* | 4/2021 | Sharma | G06V 10/774 |
| 2011/0149107 | A1* | 6/2011 | Tsukikawa | H04N 23/631 |
| | | | | 348/222.1 |
| 2014/0340425 | A1* | 11/2014 | Tsukikawa | G09G 5/14 |
| | | | | 345/634 |
| 2014/0376786 | A1* | 12/2014 | Johnson | G06F 18/22 |
| | | | | 382/118 |
| 2016/0147399 | A1* | 5/2016 | Berajawala | H04L 67/10 |
| | | | | 715/753 |
| 2016/0162458 | A1* | 6/2016 | Munro | G06F 16/93 |
| | | | | 715/230 |
| 2017/0099200 | A1* | 4/2017 | Ellenbogen | G06V 10/764 |
| 2017/0293640 | A1* | 10/2017 | Kish | G06V 10/7784 |

(Continued)

FOREIGN PATENT DOCUMENTS

| | | |
|---|---|---|
| JP | 2007285705 A | 11/2007 |
| JP | 2012038244 A | 2/2012 |

(Continued)

*Primary Examiner* — Jonathan C Kim
(74) *Attorney, Agent, or Firm* — Canon U.S.A., Inc. IP Division

(57) ABSTRACT

An information processing apparatus includes an acquisition unit configured to acquire a first annotation that is for an addition target and is based on input from an operator, a comparison unit configured to compare the first annotation acquired by the acquisition unit and a second annotation that is a comparison target, a determination unit configured to determine whether there is a decrease in recognition accuracy of the operator based on the comparison by the comparison unit, and a warning unit configured to provide a warning in a case where the determination unit determines that there is a decrease in recognition accuracy of the operator.

10 Claims, 30 Drawing Sheets

(56) References Cited

U.S. PATENT DOCUMENTS

| | | | | |
|---|---|---|---|---|
| 2018/0181805 A1* | 6/2018 | Asl | .................. | G06V 10/82 |
| 2019/0026952 A1* | 1/2019 | Bordeaux | ............ | G06V 10/987 |
| 2019/0034831 A1* | 1/2019 | Perona | .................. | G06F 16/285 |
| 2019/0042894 A1* | 2/2019 | Anderson | .............. | G06N 20/00 |
| 2019/0114556 A1* | 4/2019 | Ye | .......................... | G06V 40/10 |
| 2019/0171914 A1* | 6/2019 | Zlotnick | ................ | G06F 18/41 |
| 2019/0294970 A1* | 9/2019 | Fidler | .................... | G06V 10/82 |
| 2019/0311024 A1* | 10/2019 | Munro | .................... | G06F 16/35 |
| 2019/0361966 A1* | 11/2019 | Munro | .............. | G06F 16/24532 |
| 2019/0370333 A1* | 12/2019 | Akbik | ..................... | G06F 40/30 |
| 2019/0384807 A1* | 12/2019 | Dernoncourt | .......... | G06N 3/045 |
| 2020/0019799 A1* | 1/2020 | Shen | ...................... | G06V 10/25 |
| 2020/0129263 A1* | 4/2020 | Izadyyazdanabadi | ...................... | |
| | | | | G06F 18/2413 |
| 2020/0167689 A1* | 5/2020 | Pojman | ................ | G06V 20/176 |
| 2020/0202171 A1* | 6/2020 | Hughes | ................. | G06F 18/214 |
| 2020/0293712 A1* | 9/2020 | Potts | .................. | G06F 3/04842 |
| 2021/0042530 A1* | 2/2021 | Kim | ...................... | G06F 18/214 |
| 2021/0042577 A1* | 2/2021 | Martin | .................... | G06N 20/20 |
| 2021/0216746 A1* | 7/2021 | Nie | ....................... | G06F 18/243 |
| 2021/0383262 A1* | 12/2021 | Elen | .................... | G06F 18/2163 |
| 2021/0390250 A1* | 12/2021 | Tsukikawa | ............ | G06F 40/169 |

FOREIGN PATENT DOCUMENTS

| | | |
|---|---|---|
| JP | 2015166975 A | 9/2015 |
| JP | 2019096319 A | 6/2019 |
| JP | 2019159941 A | 9/2019 |
| WO | 2019167556 A | 9/2019 |

\* cited by examiner

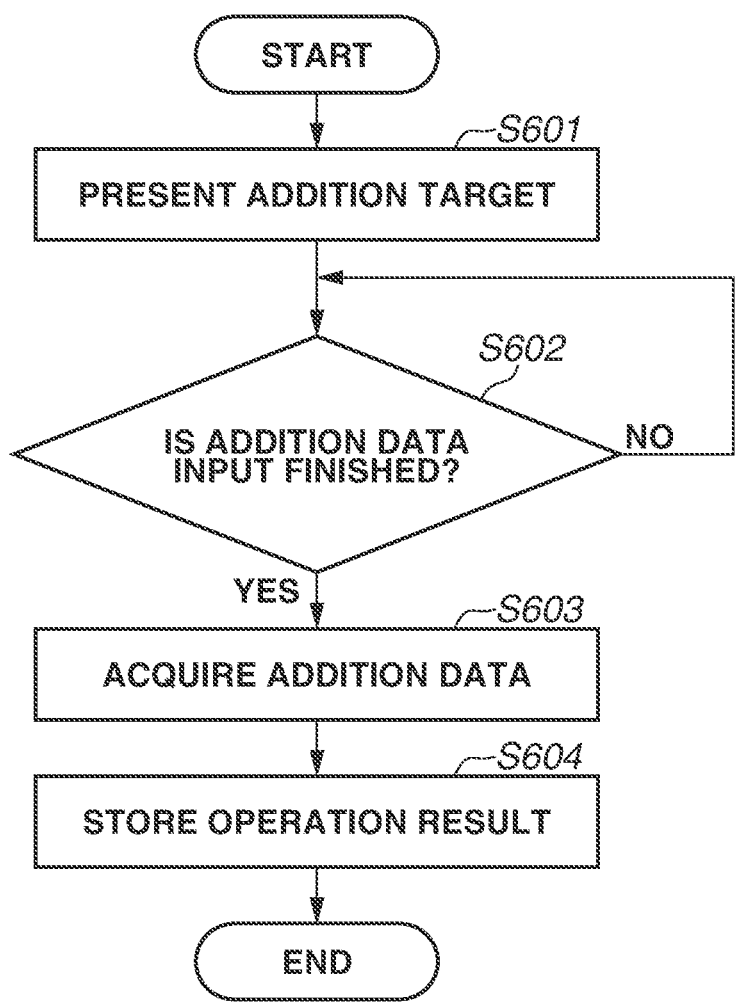

FIG.7A

| ID (711) | FILE PATH (712) | CONCENTRATION DETERMINATION FLAG (713) |
|---|---|---|
| 1 | //example.org/images/001.jpg | TRUE |
| 2 | //example.org/images/002.jpg | FALSE |
| 3 | //example.org/images/003.jpg | FALSE |

FIG.7B

| ID (721) | ESTIMATION RESULT LABEL (722) | PROBABILITY (723) | IMAGE ID (724) |
|---|---|---|---|
| 1 | ORDINARY VEHICLE | 95 | 1 |
| 2 | ORDINARY VEHICLE | 56 | 2 |
| 3 | PICKUP TRUCK | 87 | 3 |

FIG.7C

| ID (731) | ADDITION RESULT LABEL (732) | IMAGE ID (733) |
|---|---|---|
| 1 | ORDINARY VEHICLE | 1 |
| 2 | SUV | 2 |

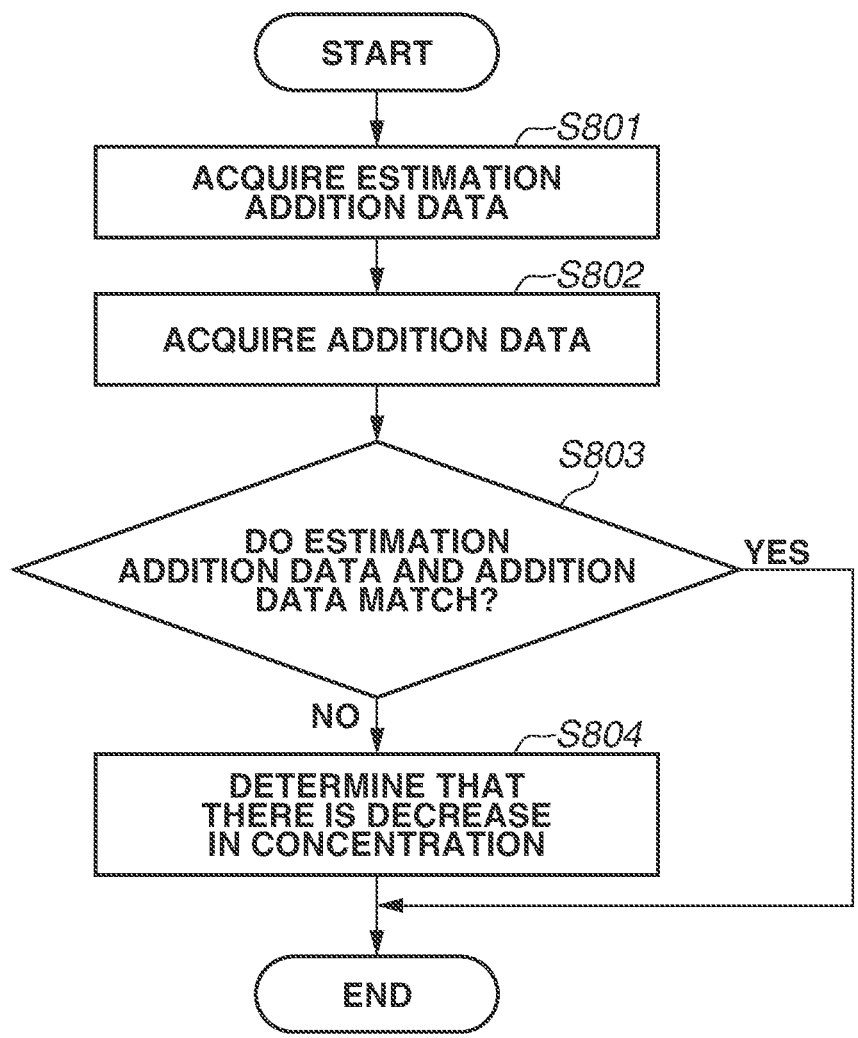

FIG.14A

| ID | FILE PATH | CONCENTRATION DETERMINATION FLAG |
|---|---|---|
| 1 | //example.org/images/001.jpg | FALSE |
| 2 | //example.org/images/002.jpg | TRUE |
| X | //example.org/images/00x.jpg | FALSE |

| ID | ESTIMATION RESULT LABEL | PROBABILITY | IMAGE ID | REGION ID |
|---|---|---|---|---|
| 1 | ORDINARY VEHICLE | 95 | 1 | 1 |
| 2 | SUV | 56 | 1 | 2 |
| Y | PICKUP TRUCK | 87 | X | Z |
| Y+1 | SUV | 70 | X | Z+1 |

| ID | ADDITION RESULT LABEL | START DATE/TIME | END DATE/TIME | IMAGE ID | REGION ID |
|---|---|---|---|---|---|
| 1 | ORDINARY VEHICLE | 2019/12/16 09:35:14 | 2019/12/16 09:37:20 | 1 | L |
| 2 | PICKUP TRUCK | 2019/12/16 09:35:14 | 2019/12/16 09:27:20 | 1 | L+1 |
| I | ORDINARY VEHICLE | 2019/12/16 15:33:32 | 2019/12/16 15:36:11 | 1 | M |
| I+1 | SUV | 2019/12/16 15:33:32 | 2019/12/16 15:36:11 | 1 | M+1 |
| J | PICKUP TRUCK | 2019/12/17 11:23:52 | 2019/12/17 11:25:20 | X | N |
| J+1 | SUV | 2019/12/17 11:23:52 | 2019/12/17 11:25:20 | X | N+1 |

| ID | START POINT X | START POINT Y | WIDTH | HEIGHT |
|---|---|---|---|---|
| 1 | 11 | 10 | 500 | 300 |
| 2 | 478 | 362 | 1000 | 300 |
| Z | 18 | 34 | 800 | 300 |
| Z+1 | 20 | 412 | 700 | 400 |
| L | 8 | 14 | 489 | 294 |
| L+1 | 483 | 355 | 1005 | 310 |
| M | 12 | 15 | 492 | 297 |
| M+1 | 486 | 360 | 1002 | 305 |
| N | 12 | 28 | 794 | 296 |
| N+1 | 19 | 408 | 682 | 412 |

FIG.22

| ID | ADDITION DATA | IMAGE ID | OPERATOR ID |
|---|---|---|---|
| 001 | SUV | 002 | B |
| 002 | ORDINARY VEHICLE | 001 | A |
| 007 | SUV | 007 | A |
| 008 | ORDINARY VEHICLE | 008 | A |
| 009 | SUV | 007 | C |
| 010 | PICKUP TRUCK | 007 | B |
| 011 | SUV | 007 | D |
| 012 | SUV | 009 | B |
| 013 | ORDINARY VEHICLE | 010 | C |
| 014 | PICKUP TRUCK | 007 | E |
| 015 | PICKUP TRUCK | 007 | F |
| 016 | ORDINARY VEHICLE | 011 | D |

FIG.25A

| ID | ESTIMATION RESULT LABEL | PROBABILITY | IMAGE ID | REGION ID |
|---|---|---|---|---|
| 001 | ORDINARY VEHICLE | 94 | 001 | 001 |
| 002 | SUV | 82 | 002 | 002 |
| 003 | ORDINARY VEHICLE | 59 | 003 | 003 |
| 004 | ORDINARY VEHICLE | 68 | 004 | 004 |
| 005 | SUV | 76 | 005 | 005 |
| 006 | ORDINARY VEHICLE | 90 | 006 | 006 |
| 007 | ORDINARY VEHICLE | 74 | 007 | 007 |
| 008 | PICKUP TRUCK | 46 | 008 | 008 |
| 009 | SUV | 72 | 008 | 009 |
| 010 | ORDINARY VEHICLE | 91 | 009 | 010 |
| 011 | ORDINARY VEHICLE | 79 | 010 | 011 |
| 012 | SUV | 62 | 011 | 012 |
| 013 | ORDINARY VEHICLE | 89 | 012 | 013 |
| N | SUV | 38 | N | N |

FIG.25B

| ID | START POINT X | START POINT Y | WIDTH | HEIGHT |
|---|---|---|---|---|
| 001 | 258 | 120 | 587 | 379 |
| 002 | 424 | 379 | 649 | 278 |
| 003 | 275 | 269 | 664 | 377 |
| 004 | 416 | 73 | 660 | 382 |
| 005 | 164 | 197 | 771 | 447 |
| 006 | 57 | 341 | 1023 | 348 |
| 007 | 153 | 182 | 640 | 357 |
| 008 | 20 | 35 | 489 | 304 |
| 009 | 478 | 362 | 662 | 395 |
| 010 | 347 | 290 | 616 | 335 |
| 011 | 255 | 139 | 857 | 361 |
| 012 | 191 | 210 | 798 | 465 |
| 013 | 151 | 220 | 627 | 305 |
| N | 294 | 363 | 835 | 242 |

FIG.29

21401
| ADDITION TARGET ID: 001 |
| ADDITION TARGET ID: 005 |
| ADDITION TARGET ID: 008 |
| ～～～ |
| ADDITION TARGET ID: N |

21402
| ADDITION TARGET ID: 002 |
| ADDITION TARGET ID: 006 |
| ADDITION TARGET ID: 008 |
| ～～～ |
| ADDITION TARGET ID: N |

21403
| ADDITION TARGET ID: 003 |
| ADDITION TARGET ID: 007 |
| ADDITION TARGET ID: 009 |
| ～～～ |
| ADDITION TARGET ID: N |

21404
| ADDITION TARGET ID: 003 |
| ADDITION TARGET ID: 008 |
| ADDITION TARGET ID: 010 |
| ～～～ |
| ADDITION TARGET ID: N |

21405
| ADDITION TARGET ID: 003 |
| ADDITION TARGET ID: 008 |
| ADDITION TARGET ID: 011 |
| ～～～ |
| ADDITION TARGET ID: N |

21406
| ADDITION TARGET ID: 004 |
| ADDITION TARGET ID: 008 |
| ADDITION TARGET ID: 012 |
| ～～～ |
| ADDITION TARGET ID: N |

INFORMATION PROCESSING APPARATUS

BACKGROUND

Field

The present disclosure relates to an information processing technique.

Description of the Related Art

Classification by adding an annotation or a tag to a target is widely performed. In recent years, annotation addition and tagging are not only used in classification for organizing but also used as supervisory data in machine learning.

An operation of adding an annotation, however, is generally monotonous and has an issue that repeating the monotonous operation decreases the concentration of the operator and errors often occur.

Japanese Patent Application Laid-Open No. 2019-159941 discusses a method of estimating whether there is a decrease in concentration of an operator by monitoring the operator. In this method, the amount of brain activity and the emotional state of an operator performing a specific operation are acquired by measuring physiological parameters of the operator. Further, the concentration level of the operator is determined, and a correspondence relationship is identified by machine learning based on data on the amount of brain activity, the emotional state, and the concentration level. Then, whether the operator concentrates is estimated based on the identified correspondence relationship.

SUMMARY

An information processing apparatus according to various embodiments of the present disclosure includes the following configuration.

The information processing apparatus includes an acquisition unit configured to acquire a first annotation that is for an addition target and is based on input from an operator, a comparison unit configured to compare the first annotation acquired by the acquisition unit and a second annotation that is a comparison target, a determination unit configured to determine whether there is a decrease in recognition accuracy of the operator based on the comparison by the comparison unit, and a warning unit configured to provide a warning in a case where the determination unit determines that there is a decrease in concentration of the operator.

Further features of the present disclosure will become apparent from the following description of exemplary embodiments with reference to the attached drawings.

BRIEF DESCRIPTION OF THE DRAWINGS

FIG. 6 is a flowchart illustrating a process of receiving addition data according to one embodiment.

FIGS. 7A to 7C are diagrams illustrating an example of data stored in an operation result storage unit according to one embodiment.

FIG. 8 is a flowchart illustrating a process of determining whether there is a decrease in concentration according to one embodiment

FIGS. 14A to 14D are diagrams illustrating an example of data stored in an operation result storage unit according to one embodiment.

FIG. 22 is a diagram illustrating an example of a table that stores addition data added by an operator according to one embodiment.

FIGS. 25A and 25B are diagrams illustrating an example of a table that stores results of estimating addition data to be added to addition targets according to one embodiment.

FIG. 29 is a diagram illustrating an example of an operation queue that stores addition targets for use by an operator in performing an operation according to one embodiment.

DESCRIPTION OF THE EMBODIMENTS

The method discussed in Japanese Patent Application Laid-Open No. 2019-159941 requires an apparatus such as an electroencephalograph that has no direct relation to actual operations in determining the concentration level. Thus, there is a room for improvement in simplification of the determination of a decrease in recognition accuracy resulting from a decrease in concentration of an operator during an operation of adding an annotation.

Exemplary embodiments that facilitate the determination of a decrease in recognition accuracy of an operator during an operation of adding an annotation and provide a warning about a decrease in recognition accuracy will be described below.

Various exemplary embodiments of the present disclosure are be described in detail below with reference to the attached drawings. It should be noted that each configuration described in the below-described exemplary embodiments is a mere example and the present disclosure is not limited to the illustrated configurations.

Figure 1:
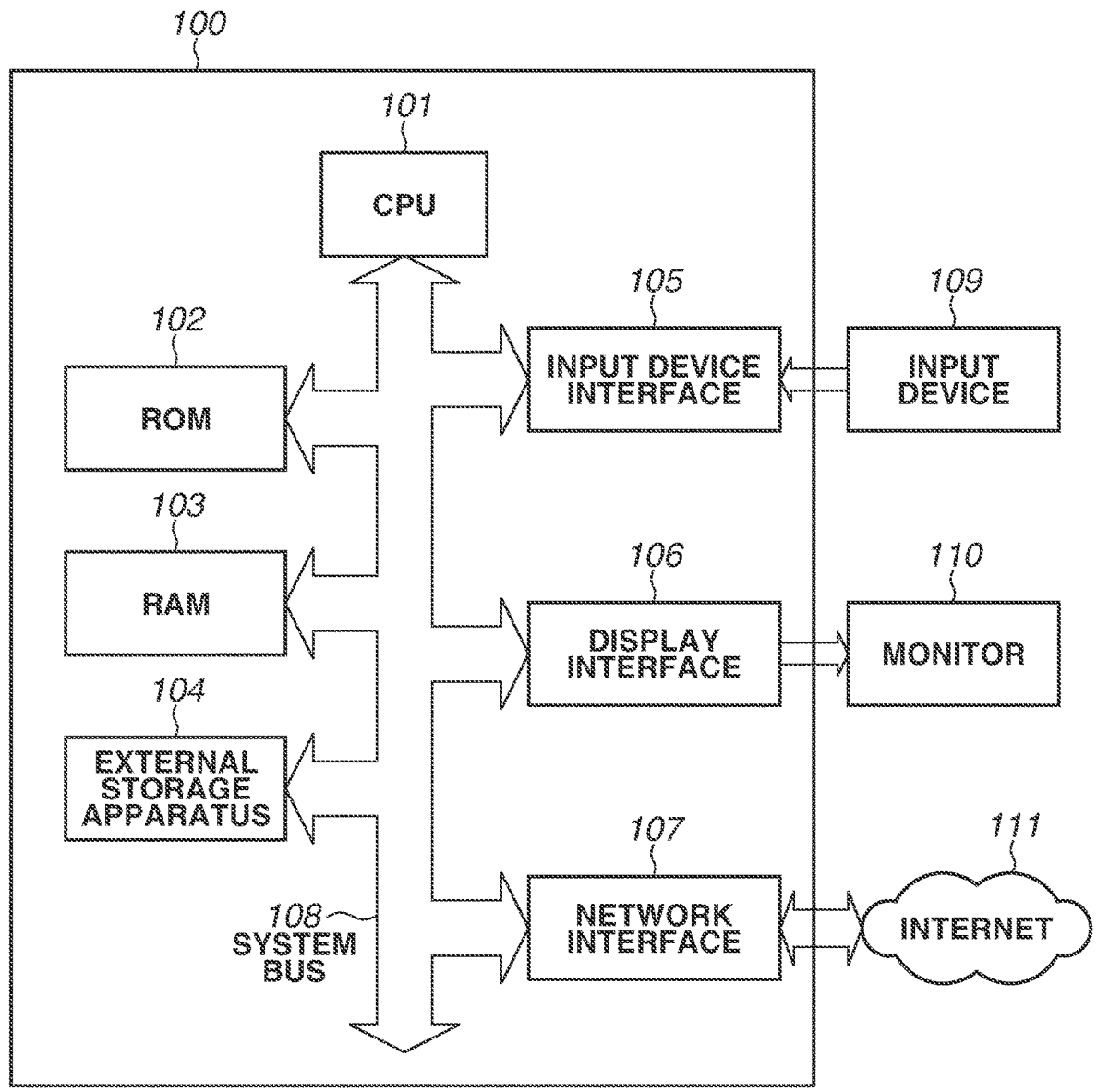
FIG. 1 is a diagram illustrating a hardware configuration of an information processing apparatus according to one embodiment.

FIG. 1 is a diagram illustrating a hardware configuration of an information processing apparatus 100 according to a first exemplary embodiment. The information processing apparatus 100 described in the following exemplary embodiment is a computer apparatus having a configuration illustrated by the block diagram in FIG. 1. Further, while the information processing apparatus 100 will be described as a single apparatus, the information processing apparatus 100 is not limited to that described below. Specifically, a method according to an exemplary embodiment can be realized by a single computer apparatus or can be realized by distributing functions to a plurality of computer apparatuses as needed. In a configuration including a plurality of computer apparatuses, the plurality of computer apparatuses is connected via a local area network (LAN) so as to communicate with one another.

In FIG. 1, a central processing unit (CPU) 101 controls the entire information processing apparatus 100. A read-only memory (ROM) 102 stores programs and parameters that do not need to be changed. A random access memory (RAM) 103 temporarily stores programs and data fed from an external apparatus.

An external storage apparatus 104 is a hard disk or a memory card installed in the information processing apparatus 100. The external storage apparatus 104 can be in a fixed state or in a removable state. Examples include an optical disk such as a flexible disk (FD) or a compact disk (CD), a magnetic card, an optical card, an integrated circuit (IC) card, and a memory card. An input device interface 105 is an interface for an input device 109 such as a pointing device or a keyboard, and data is input by a user operation by the input device 109. A display interface 106 is an interface for a monitor 110 that displays data stored in the information processing apparatus 100 and fed data. A network interface 107 is an interface for connecting to a network line such as the Internet 111. A system bus 108 communicably connects the units 101 to 107.

The information processing apparatus 100 according to the present exemplary embodiment is an apparatus that adds an annotation to an addition target (e.g., content such as an image or a sentence). The annotation is a name and/or an explanation of an object contained in the addition target. Further, the information processing apparatus 100 determines a decrease in recognition accuracy that is caused by a decrease in concentration of an operator performing an annotation addition operation based on operation performance. In a case where a decrease in recognition accuracy is detected based on a result of the determination, the information processing apparatus 100 provides a warning/attention attraction to the operator.

Figure 2:
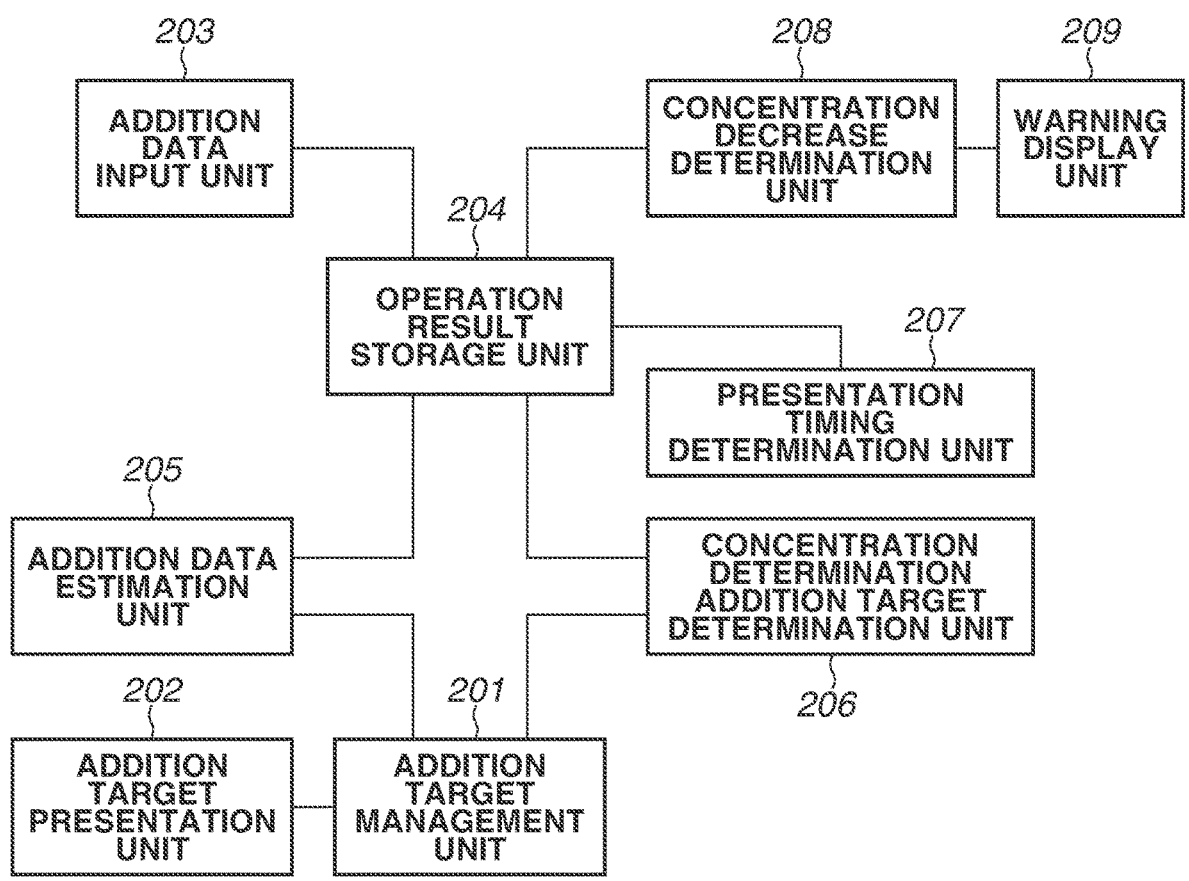
FIG. 2 is a diagram illustrating a functional configuration of the information processing apparatus according to one embodiment.

A functional configuration of the information processing apparatus 100 according to the present exemplary embodiment will be described below with reference to FIG. 2. The CPU 101 reads a program stored in the ROM 102 or the external storage apparatus 104 and executes the read program to calculate information, process information, and control each piece of hardware, whereby the functional configuration described below is realized. Each functional configuration can be realized by hardware such as an application-specific integrated circuit (ASIC) and a field-programmable gate array (FPGA).

The information processing apparatus 100 according to the present exemplary embodiment includes an addition target management unit 201 and an addition target presentation unit 202 as a unit for processing an addition target to be presented to the operator. Further, the information processing apparatus 100 includes an addition data input unit 203 and an operation result storage unit 204 as a unit for processing an operation of adding information to an addition target by the operator. In addition, the information processing apparatus 100 includes an addition data estimation unit 205 as a unit for pre-estimating addition data to be added to an addition target. Furthermore, the information processing apparatus 100 includes a concentration determination addition target determination unit 206 configured to identify an addition target suitable for concentration determination from among addition targets. Lastly, the information processing apparatus 100 includes a presentation timing determination unit 207, a concentration decrease determination unit 208, and a warning display unit 209 as a unit that determines whether the operator is concentrating and provides an attention attraction and warns the operator in a case where it is determined that the operator is not concentrating.

The addition target management unit 201 manages a concentration determination addition target for concentration determination, which will be described below, and an addition target to which the operator is to add information. The addition target management unit 201 not only simply manages the addition targets but also has an addition target storage queue and a concentration determination addition target storage queue. The addition target storage queue stores the addition targets that are to be operated, and the concentration determination addition target storage queue manages the concentration determination addition targets. The addition targets are specifically an image, a moving image, a character string that forms a natural language such as a sentence, and a file. Hereinafter, an image will be described as an example of an addition target.

Figure 3:
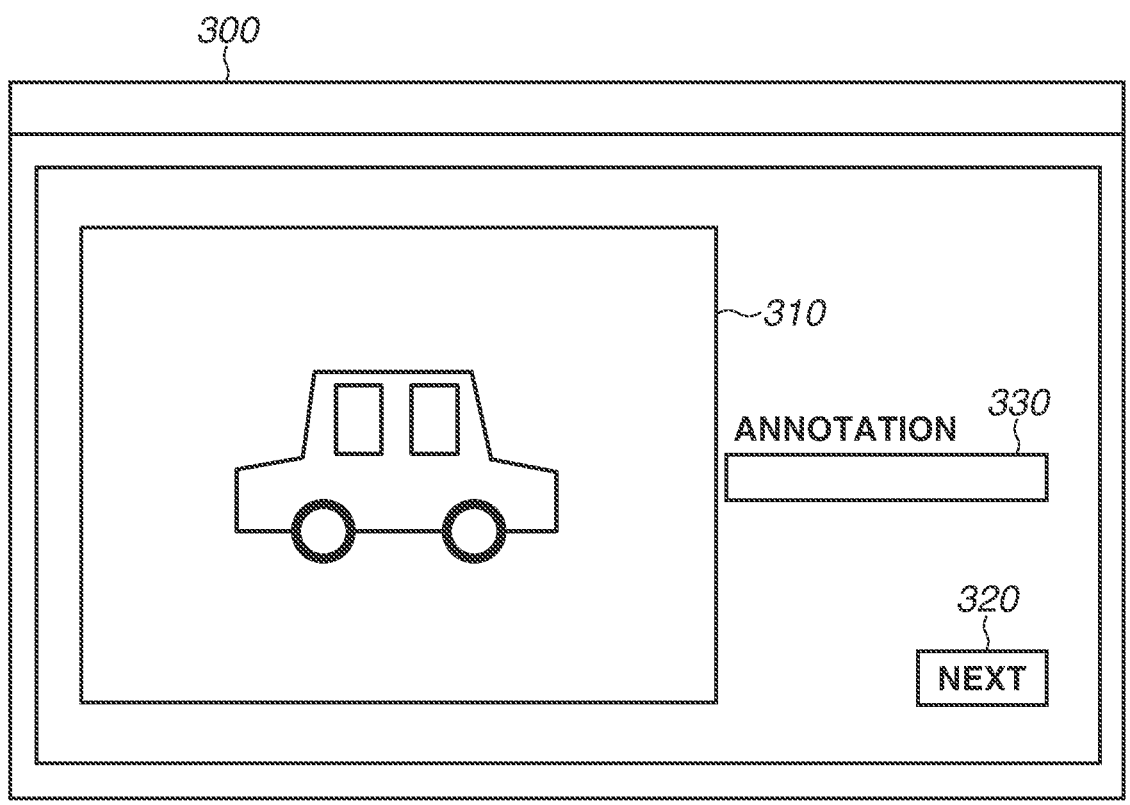
FIG. 3 is a diagram illustrating an example of a screen output by the information processing apparatus according to one embodiment.

The addition target presentation unit 202 presents the addition targets managed by the addition target management unit 201 to the operator. The addition data input unit 203 receives addition data input containing an annotation to be added by the operator to an addition target presented by the addition target presentation unit 202. FIG. 3 illustrates an example of a user interface that is presented to the operator.

In FIG. 3, an addition target presentation window 300 includes an addition target display region 310, an addition target selection button 320, and an addition data input region 330. The addition target presentation unit 202 corresponds to the addition target display region 310 and the addition target selection button 320, and the addition data input unit 203 corresponds to the addition data input region 330.

An addition operation of adding addition data to one addition target by the operator includes checking an addition target displayed on the addition target display region 310 and inputting annotation information to be added to the addition target to the addition data input region 330. In a case where the input ends, the addition target displayed on the addition target display region 310 is changed using the addition target selection button 320, and the changing is repeated until there is no more addition target.

The operation result storage unit 204 stores the addition target presented by the addition target presentation unit 202 and the addition data input to the addition data input unit 203 in association. Similarly, the operation result storage unit 204 stores estimation addition data that is a result of estimation by the addition data estimation unit 205, which will be described below, in association with the addition target.

The addition data estimation unit 205 pre-estimates addition data to be added to the addition targets managed by the addition target management unit 201. For the estimation, a pre-trained model is generated by learning a relationship between an addition target of the same type as the addition target managed by the addition target management unit 201 and addition data to be added to the addition target of the same type by machine learning. Then, the information processing apparatus 100 estimates addition data to be added for each addition target managed by the addition target management unit 201 using the pre-trained model. The estimated addition data is stored as estimation addition data in association with the addition target in the operation result storage unit 204.

The addition target of the same type in a case where, for example, the operator checks a car in an image and adds the type of the car as addition data is an image that is different from the image managed by the addition target management unit 201 and contains the car. Further, the estimation addition data contains a result of the estimation using the pre-trained model and a probability thereof. An example of estimation addition data will be described below with reference to FIGS. 7A to 7C.

Further, the pre-trained model for use by the addition data estimation unit 205 can be acquired by execution of machine learning by the information processing apparatus 100 or can be acquired by externally acquiring a trained model generated by machine learning. In a case where the information processing apparatus 100 executes machine learning, the information processing apparatus 100 can further include a graphical processing unit (GPU) to execute machine learning using the GPU in addition to the CPU 101. The GPU is effective in a case where learning is executed a plurality of times as in deep learning because more data can be processed in parallel to realize efficient computation.

Specific algorithms of machine learning are a nearest neighbor algorithm, a naive Bayes algorithm, a decision tree, and a support vector machine. Another specific algorithm is deep learning that by itself generates a feature amount and a connection weight coefficient for learning using a neural network. An algorithm that can be used among the above-described algorithms is used and applied to the present exemplary embodiment as needed.

To generate a trained model, a plurality of combinations of input data and output data is prepared as training data (supervisory data). Machine learning is executed using the training data to acquire knowledge, and a trained model that outputs output data corresponding to input data as a result is generated based on the acquired knowledge. The trained model can be updated after a predetermined process as needed.

The concentration determination addition target determination unit 206 determines whether the addition targets managed by the addition target management unit 201 can be used in determining whether there is a decrease in concentration. A determination process executed by the concentration determination addition target determination unit 206 will be described below with reference to a flowchart illustrated in FIG. 4.

Figure 4:
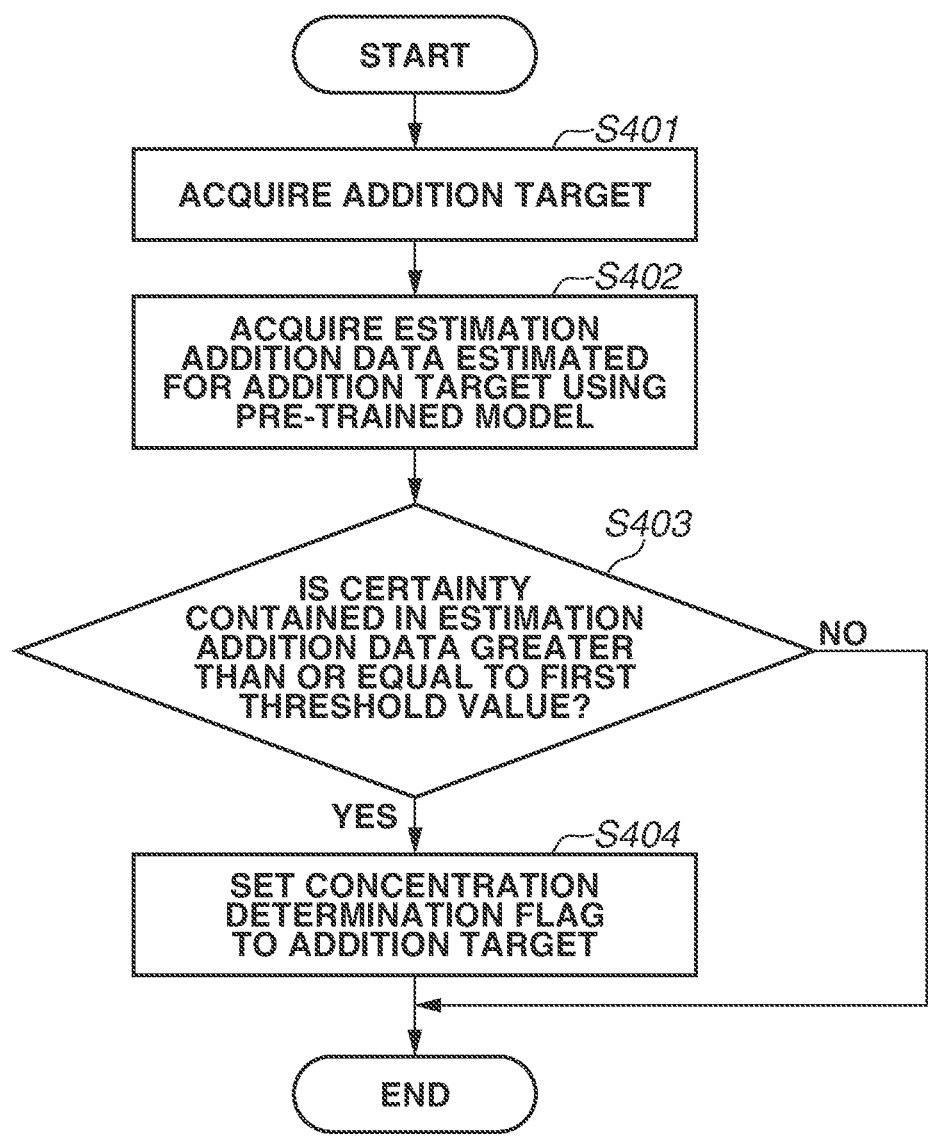
FIG. 4 is a flowchart illustrating a process of determining a concentration determination addition target according to one embodiment.

The CPU 101 reads a program stored in the ROM 102 or the external storage apparatus 104 and executes the read program to calculate information, process information, and control the hardware, whereby each step in the flowcharts illustrated in FIG. 4 and subsequent drawings is realized. The steps in the flowcharts illustrated in FIG. 4 and the subsequent drawings can partially or entirely be realized by a single piece of hardware or a plurality of pieces of hardware such as an ASIC and a FPGA.

In step S401, the concentration determination addition target determination unit 206 acquires one addition target from the addition target management unit 201.

In step S402, the concentration determination addition target determination unit 206 acquires estimation addition data that is estimated for the addition target acquired in step S401 from the operation result storage unit 204.

In step S403, the concentration determination addition target determination unit 206 determines whether certainty information contained in the estimation addition data acquired in step S402 is greater than or equal to a first threshold value. In a case where the concentration determination addition target determination unit 206 determines that the certainty information is greater than or equal to the first threshold value (YES in step S403), the processing proceeds to step S404. On the other hand, in a case where the concentration determination addition target determination unit 206 determines that the certainty information is lower than the first threshold value (NO in step S403), the process ends.

The first threshold value can be a value preset by the user, or a trend of certainty information contained in estimation addition data for the addition targets managed by the addition target management unit 201 can be used. The use of the trend of certainty information is, for example, use of a value obtained by adding a doubled value of a standard deviation δ in a positive direction from an average of probabilities as the first threshold value. Further, instead of using the first threshold value, the determination can be based on whether the certainty information contained in the estimation addition data for the addition target is within the top 5% of all addition targets.

In step S404, the concentration determination addition target determination unit 206 sets a concentration determination flag to the addition target. Thereafter, the process ends. In a case where the addition target management unit 201 manages addition targets using a database, the concentration determination flag can be set as a column of the database, or in a case where an addition target is a file, the concentration determination flag can be added as metadata of the file.

Steps S401 to S404 are executed on each addition target, and the concentration determination addition target determination unit 206 executes steps S401 to S404 on every one of the addition targets managed by the addition target management unit 201.

As described above, the information processing apparatus 100 uses a target with a high certainty of estimation addition data in checking the concentration of the operator so that the concentration is determined with high accuracy.

The presentation timing determination unit 207 determines a timing to present a concentration determination addition target, which is a result of calculation by the concentration determination addition target determination unit 206, to the operator.

The concentration decrease determination unit 208 determines whether there is a decrease in concentration using the addition data added by the operator to the concentration determination addition target displayed by the addition target presentation unit 202. Details thereof will be described below with reference to FIG. 8.

The warning display unit 209 provides an attention attraction and/or a warning to the operator in a case where the concentration decrease determination unit 208 determines that there is a decrease in concentration.

Figure 5:
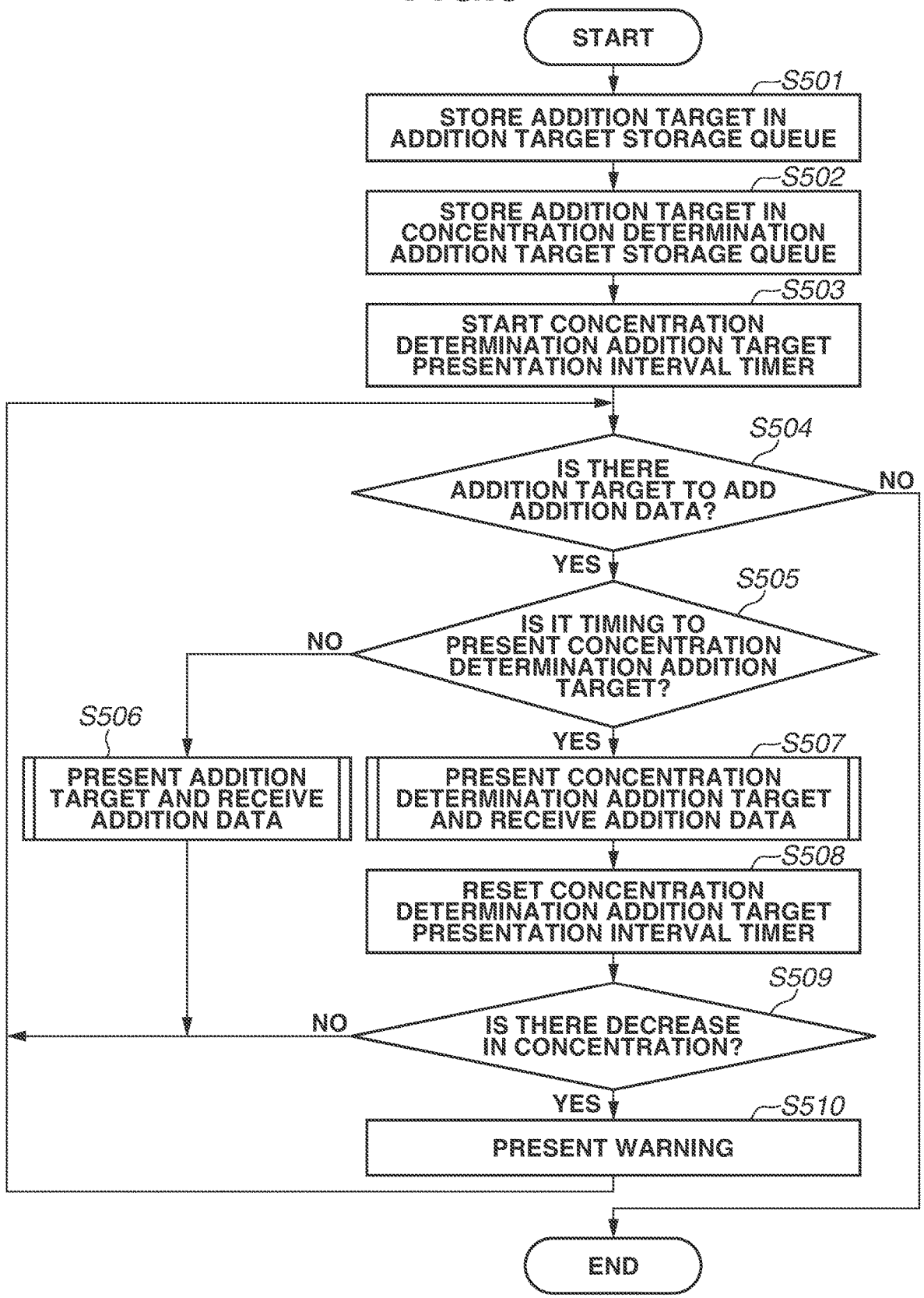
FIG. 5 is a flowchart illustrating an entire process of the information processing apparatus according to one embodiment.

Next, a comprehensive process of the information processing apparatus 100 according to the present exemplary embodiment will be described below with reference to FIG. 5.

In step S501, the information processing apparatus 100 stores an addition target to be operated by the operator in the addition target storage queue from among the addition targets managed by the addition target management unit 201. The addition target storage queue can be a separate addition target storage queue generated for each operator or can be a single queue for use by a plurality of operators.

In step S502, the information processing apparatus 100 stores an addition target having the concentration determination flag in the concentration determination addition target storage queue from among the addition targets managed by the addition target management unit 201.

In step S503, the information processing apparatus 100 starts a concentration determination addition target presentation interval timer to acquire the elapsed time from the concentration determination addition target presentation.

In step S504, the information processing apparatus 100 checks whether there is an addition target in the addition target storage queue in which the addition target is stored in step S501. In a case where there is an addition target (YES in step S504), the processing proceeds to step S505. On the other hand, in a case where there is not an addition target (NO in step S504), the process ends.

In step S505, the information processing apparatus 100 determines whether it is a timing to present the concentration determination addition target by the presentation timing determination unit 207. Specifically, this determination is performed based on whether the time specified by the concentration determination addition target presentation interval timer is longer than or equal to a predetermined time period. Specifically, the information processing apparatus 100 periodically determines a decrease in concentration at predetermined intervals and does not perform the determination during the predetermined time period from the previous determination. The predetermined time period can be a fixed time period such as ten minutes or can be a fixed time period such as ten minutes with a predetermined random range (minus two minutes to plus two minutes). In a case where the information processing apparatus 100 determines that it is not a timing to present the concentration determination addition target yet (NO in step S505), the processing proceeds to step S506. On the other hand, in a case where the information processing apparatus 100 determines that it is a timing to present the concentration determination addition target (YES in step S505), the processing proceeds to step S507. As described above, the information processing apparatus 100 periodically determines whether there is a decrease in concentration, and this prevents the operator from continuing the operation with the decreased concentration and prevents an error in the annotation addition operation due to the decreased concentration beforehand.

In step S506, the information processing apparatus 100 presents the addition target via the addition target presentation unit 202 and receives addition data input by the operator. Details of this process will be described below with reference to FIG. 6. Thereafter, the processing proceeds to step S504.

In step S507, the information processing apparatus 100 presents the concentration determination addition target via the addition target presentation unit 202 and receives addition data input by the operator. The processing of step S506 and the processing of S507 are basically the same except that different addition targets are presented to the operator. Specifically, the normal addition target is presented in step S506 whereas the concentration determination addition target is presented in step S507. Further, the normal addition target and the concentration determination addition target can be treated as the same addition target for the operator. Details of the process will be described below together with step S506 with reference to FIG. 6.

In step S508, the information processing apparatus 100 resets the concentration determination addition target presentation interval timer started in step S503.

In step S509, the information processing apparatus 100 determines whether there is a decrease in concentration of the operator using the concentration decrease determination unit 208 based on addition data added to the addition target presented in step S507 by the operator and the estimation addition data of the addition target. Details of the determination process will be described below with reference to FIG. 8. In a case where the information processing apparatus 100 determines that there is not a decrease in concentration (NO in step S509), the processing proceeds to step S504. On the other hand, in a case where the information processing apparatus 100 determines that there is a decrease in concentration (YES in step S509), the processing proceeds to step S510.

In step S510, the information processing apparatus 100 provides an attention attraction and a warning using the addition target presentation unit 202 to inform the operator that there is a decrease in concentration. The information processing apparatus 100 can display a message on the monitor 110 as an attention attraction and a warning or can output a sound as an attention attraction and a warning. The information processing apparatus 100 can present to the operator information indicating that there is a possibility of a decrease in concentration as an attention attraction and a warning. Further, the information processing apparatus 100 can present information indicating that there is a possibility of a decrease in recognition accuracy of the operator as an attention attraction and a warning. Further, the information processing apparatus 100 can present information that warns the operator of eye strain as an attention attraction and a warning. Further, the information processing apparatus 100 can present information that prompts the operator to rest to the operator as an attention attraction and a warning. Further, the information processing apparatus 100 can present information indicating that there is a possibility of an error in an added annotation to the operator as an attention attraction and a warning. Further, the information processing apparatus 100 can present a combination of the attention attractions and the warnings that are described above as examples.

Next, the process of presenting the addition target and receiving the addition data input by the operator will be described below with reference to FIG. 6.

In step S601, the information processing apparatus 100 presents the addition target to the operator by acquiring the addition target from the addition target management unit 201 and displaying the addition target to the operator using the addition target presentation unit 202. In acquiring the addition target from the addition target management unit 201, the information processing apparatus 100 acquires the addition target from the addition target storage queue in a case where the addition target to be acquired is the normal addition target, or the information processing apparatus 100 acquires the addition target from the concentration determination addition target storage queue in a case where the addition target to be acquired is the concentration determination addition target.

In step S602, the information processing apparatus 100 determines whether addition data input by the operator is finished. In a case where input is finished (YES in step S602), the processing proceeds to step S603. On the other hand, in a case where input is not finished (NO in step S602), the determination is repeated until input is finished.

In step S603, the information processing apparatus 100 acquires the addition data input by the operator using the addition data input unit 203. The addition data is data that contains annotation information indicating a name and an explanation of an object contained in the addition target.

In step S604, the addition target presented in step S601 and the addition data acquired in step S603 are associated and stored as an operation result in the operation result storage unit 204. An example of the operation result data will be described below with reference to FIGS. 7A to 7C.

Examples of the estimation addition data and the operation result data will be described below with reference to FIGS. 7A to 7C.

FIGS. 7A, 7B, and 7C illustrate an example of a table of a database in the operation result storage unit 204.

An addition target storage table 710 illustrated in FIG. 7A contains three columns. Further, each addition target is represented by a single row of the addition target storage table 710. A column 711 stores identifications (IDs) for identifying images that are addition targets. A column 712 stores file paths of the images. A column 713 stores the concentration determination flags each indicating whether the corresponding addition target is a concentration determination addition target.

An estimation addition data storage table 720 illustrated in FIG. 7B contains four columns. Further, each piece of estimation addition data is represented by a single row of the estimation addition data storage table 720. A column 721 stores IDs for identifying estimation results. A column 722 stores annotation information about the estimation results. A column 723 stores certainty information about the estimation results. A column 724 stores IDs of the estimation target images.

An addition data storage table 730 illustrated in FIG. 7C contains three columns. Further, each piece of addition data is represented by a single row of the addition data storage table 730. A column 731 stores IDs for identifying the addition data. A column 732 stores addition results. A column 733 stores image IDs of the addition target images.

Next, the process of determining whether there is a decrease in concentration that is executed by the concentration decrease determination unit 208 will be described below with reference to FIG. 8.

In step S801, the information processing apparatus 100 acquires the estimation addition data for the addition target that is for use in the concentration determination by the concentration decrease determination unit 208.

In step S802, the information processing apparatus 100 acquires the addition data that is for the addition target and contains the annotation input by the operator using the concentration decrease determination unit 208. Specifically, the information processing apparatus 100 acquires the annotation added to the addition target by the operator input. In the concentration determination, the annotation specified by the estimation addition data is a target of comparison with the annotation input by the operator.

In step S803, the information processing apparatus 100 compares the estimation addition data acquired in step S801 and the addition data acquired in step S802 and determines whether the estimation addition data and the addition data match using the concentration decrease determination unit 208. In a case where the estimation addition data and the addition data matches (YES in step S803), the process ends. On the other hand, in a case where the estimation addition data and the addition data do not match (NO in step S803), the processing proceeds to step S804.

In step S804, the concentration decrease determination unit 208 of the information processing apparatus 100 determines that there is a decrease in concentration of the operator. In the present exemplary embodiment, the concentration determination addition target is determined from among the addition targets by selecting the addition target for which the certainty information contained in the estimation addition data is greater than or equal to the first threshold value. By setting the first threshold value to a significantly high value, the estimation addition data is regarded as being correct for the following reason. Specifically, the significantly high value of the certainty information of the estimation addition data indicates that a feature identifying the addition data is outstanding and in this situation the determination is easy for the operator.

Thus, in a case where addition data that is different from the estimation addition data is added by the operator, it is assumed that the operator has made a mistake in the situation where the determination is easy, so that it is determined that there is a decrease in concentration. Further, instead of using the estimation addition data as data that is regarded as being correct, whether addition data added in advance to the same addition target by another operator or an inspector verifying an operation result matches the addition data acquired in step S802 can be determined.

By the above-described process, the operator receives a warning about a possible decrease in concentration while performing the operation of adding addition data to the addition target as usual. When receiving the warning, the operator can take a rest to prevent an error that can occur as a result of forcedly performing the operation when the concentration decreases.

While it is determined that there is a decrease in concentration in a case where the annotation specified by the addition data of the estimation addition data does not match the annotation input by the operator in step S803, the configuration is not limited to that described above. In an alternative configuration, it can be determined that there is a decrease in concentration in a case where the annotation specified by the addition data of the estimation addition data and the annotation input by the operator are synonyms or are a broader concept and a narrower concept.

Figure 9:
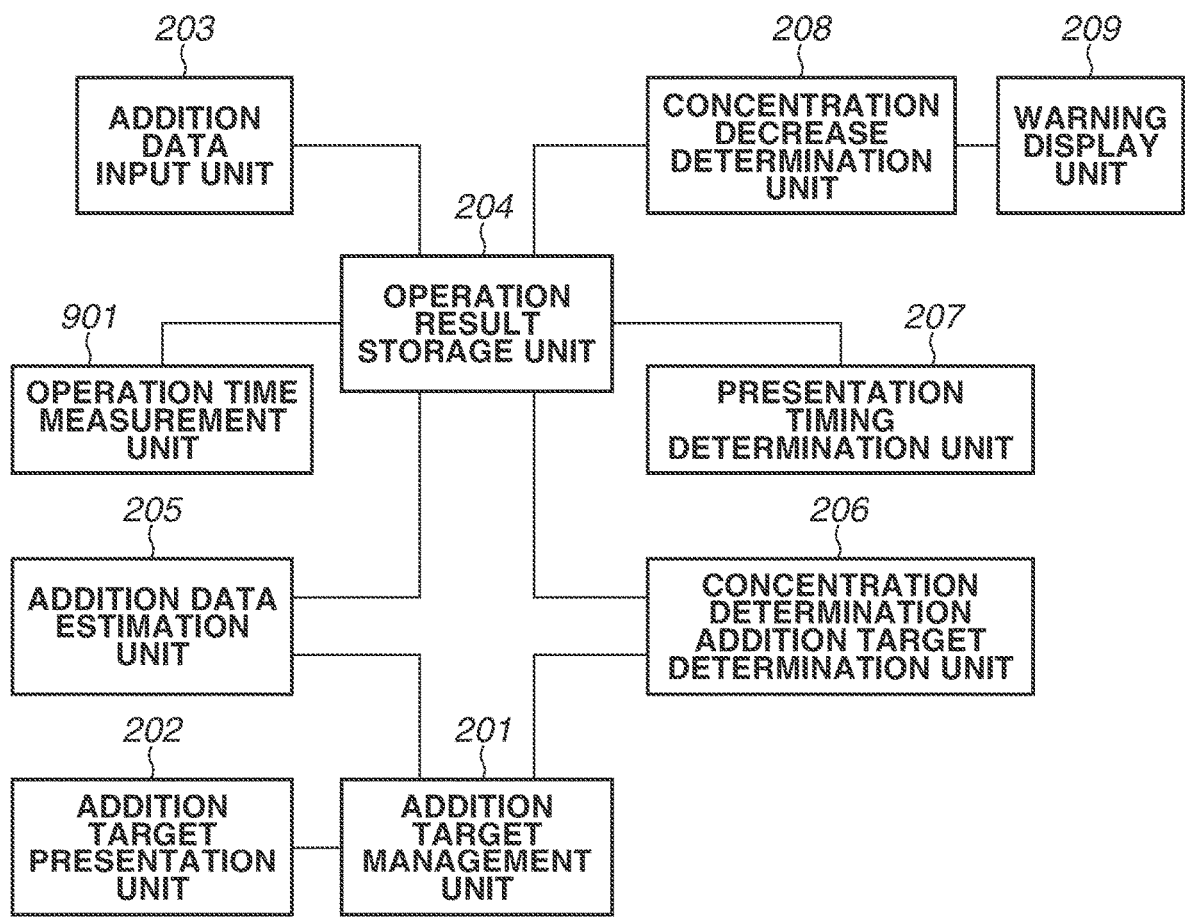
FIG. 9 is a diagram illustrating a functional configuration of an information processing apparatus according to one embodiment.

FIG. 9 illustrates a functional configuration of the information processing apparatus 100 according to a second exemplary embodiment. Each component similar to that in FIG. 2 is given the same reference number as that in FIG. 2. The information processing apparatus 100 according to the second exemplary embodiment has a hardware configuration similar to that in the first exemplary embodiment.

In FIG. 9, an operation time measurement unit 901 measures as an operation time the time from when the addition target presentation unit 202 presents the addition target to the operator to when the addition data input unit 203 receives the input.

Figure 10A:
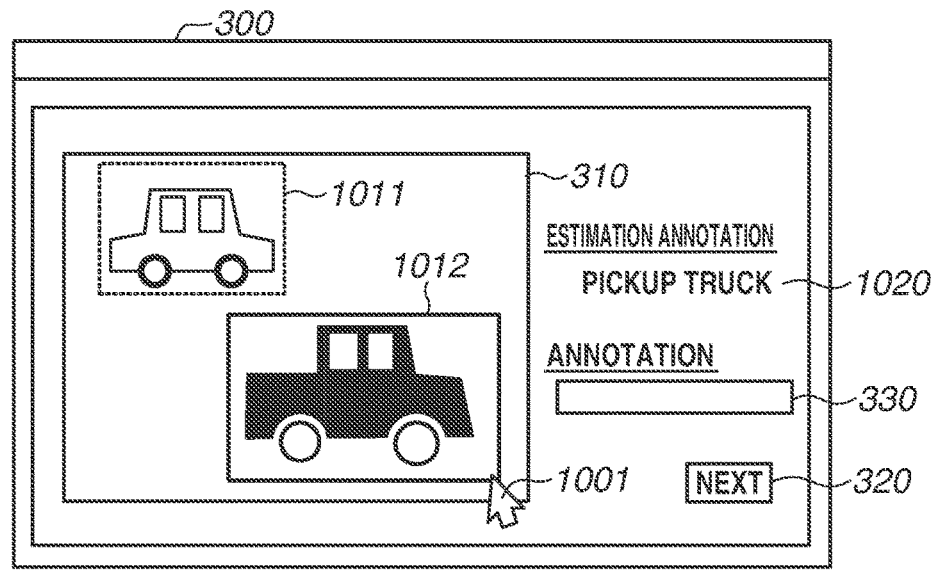
FIGS. 10A to 10C are diagrams illustrating an example of a screen output by the information processing apparatus according to one embodiment.
Figure 10B:
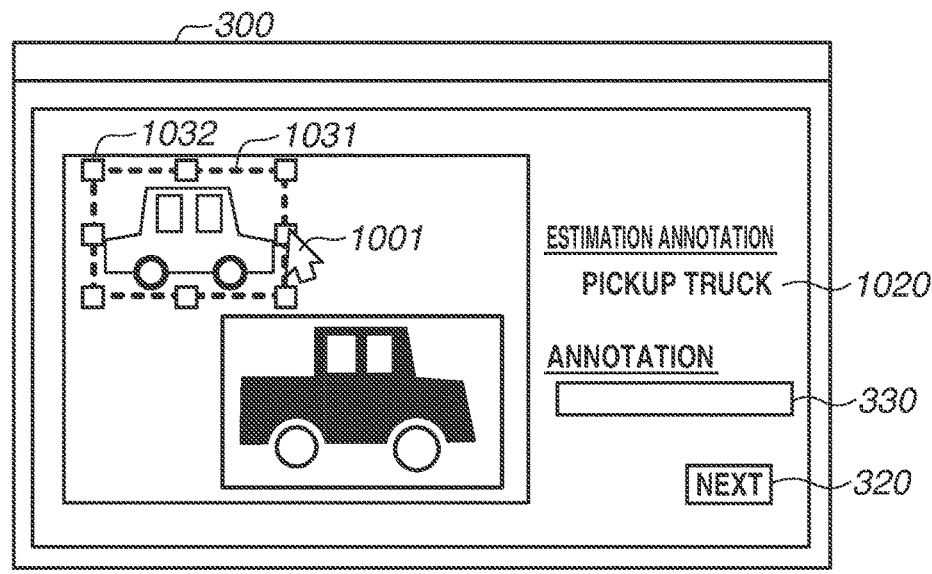
Figure 10C:
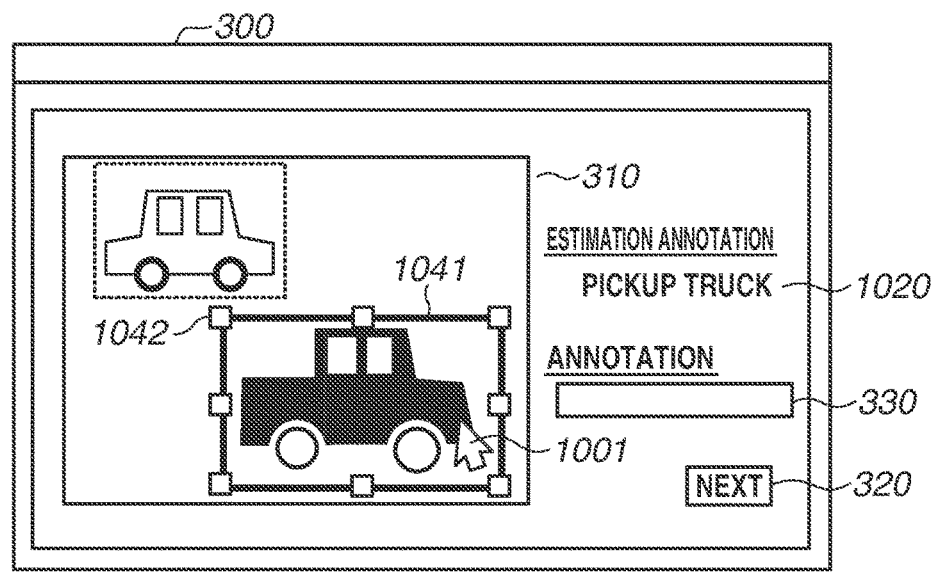

FIGS. 10A to 10C illustrate an example of a user interface for presentation to the operator according to the second exemplary embodiment. The addition target presentation window 300, the addition target display region 310, the addition target selection button 320, and the addition data input region 330 in FIG. 10A are similar to those in FIG. 3.

FIGS. 10A to 10C illustrate an example where addition data is added to each of a plurality of regions in an addition target. While an image is used as an addition target in the second exemplary embodiment as in the first exemplary embodiment, the addition target is not limited to this. For example, the addition target can be a character string of a sentence. Further, in a case where the addition target is a character string of a sentence, a specific word in the sentence can be designated to add an annotation to the designated word.

In FIGS. 10A to 10C, a cursor 1001 is used to designate a region in the addition target. A region is designated by designating a rectangular position range by a click on a pointing device, such as a mouse, and a drag. The method of designating a region by a click and a drag using a pointing device is a mere example. In another example, a publicly-known technique of designating a region on a user interface (UI) by a tap and a drag with a finger or an electronic pen on a touch panel can be used.

In FIG. 10A, a region 1011 represents a region estimated by the addition data estimation unit 205. In the example illustrated in FIGS. 10A to 10C, a boundary of a region is displayed as a dotted line to indicate that the region is an estimation region. Instead of displaying a boundary as a dotted line, the boundary or the inside of the region can be displayed in a different color to indicate that the region is an estimation region. Further, FIG. 10B illustrates a state where the region 1011 that is an estimation region is selected. In the example illustrated in FIG. 10B, a boundary of a region is displayed as a thick line to indicate that the region is selected. A region 1031 is an estimation region and is in a selected state, so that the region 1031 is displayed as a thick dotted line. After selecting the region 1031, the operator can freely change the size of the selected region 1031. To change the size, a handle 1032 is used. In the example illustrated in FIGS. 10A to 10C, the handle 1032 is arranged at each corner of the boundary of the region and at each middle point of each side of the boundary. This handle arrangement is a mere example, and the handle 1032 can be arranged at other positions.

In FIG. 10A, a region 1012 is a new region generated by the operator using the cursor 1001. FIG. 10C illustrates a state where the region 1012 is selected. In FIG. 10C, like the above-described estimation region, a boundary of the region 1012 is displayed as a thick line to indicate that the region 1012 is selected. Further, the size of the selected region 1012 in FIG. 10C can freely be changed as in FIG. 10B. To change the size, a handle 1042 is used. The handle arrangement is similar to that of the above-described estimation region.

Furthermore, the operator can add addition data to a region by inputting the addition data to the addition data input region 330 with the region being selected regardless of whether the selected region is an estimation region or a newly-generated region. In the example illustrated in FIG. 10B, inputting data to the addition data input region 330 adds the input data to the region 1031, which is the selected estimation region. Further, in the example illustrated in FIG. 10C, inputting data to the addition data input region 330 adds the input data to a region 1041, which is the selected newly-generated region.

Further, in addition to the region, annotation information is also displayed in an estimation annotation information display region 1020 as estimation addition data. Specifically, the information processing apparatus 100 estimates one or more object regions in the image and estimates addition data of an object in each estimated region. Further, the information processing apparatus 100 displays a region of each detected object as an estimation region and displays the addition data estimated for the detected object as estimation annotation information.

The displayed annotation information can be reference information for the operator, but the annotation information is a mere result of estimation based on the pre-trained model and is, therefore, not always correct. Thus, the operator checks whether the annotation displayed in the estimation annotation information display region 1020 is correct, and in a case where the displayed annotation is correct, the displayed annotation is input to the addition data input region 330, whereas in a case where the displayed annotation is incorrect, a correct annotation is input to the addition data input region 330. Certainty information can also be displayed together.

Further, while FIGS. 10A to 10C illustrate an example where the estimation annotation information display region 1020 and the addition data input region 330 are separated, the estimation annotation information display region 1020 and the addition data input region 330 can be combined into a single region. Specifically, there is a method in which the addition data input region 330 is displayed in a state where annotation information contained in estimation addition data is input.

Figure 11:
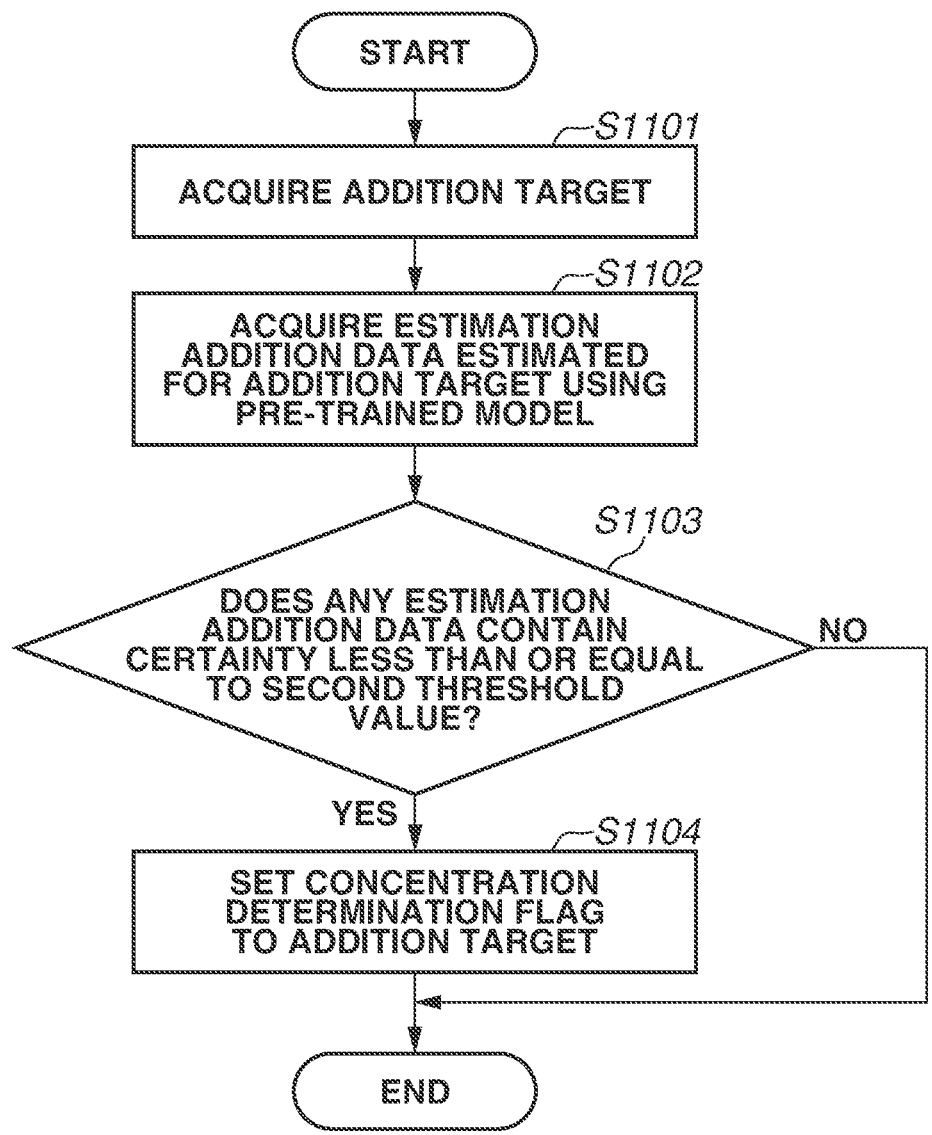
FIG. 11 is a flowchart illustrating a process of determining a concentration determination addition target according to one embodiment.

Next, a process of determining a concentration determination addition target from among addition targets by the concentration determination addition target determination unit 206 according to the second exemplary embodiment will be described below with reference to FIG. 11.

In step S1101, the concentration determination addition target determination unit 206 acquires one addition target from the addition target management unit 201.

In step S1102, the concentration determination addition target determination unit 206 acquires all the estimation addition data estimated for the addition target acquired in step S1101 from the operation result storage unit 204. In a case where addition data is to be added to a region in the addition target as illustrated in FIGS. 10A to 10C, the estimation addition data is also information about a set of the region in the addition target and the addition data. Thus, the addition data estimation unit 205 also estimates a region to add addition data and addition data for the region. Consequently, there may be a plurality of pieces of estimation addition data for the addition target. In step S1102, in a case where there is a plurality of pieces of estimation addition data, all the pieces of estimation addition data are acquired.

In step S1103, the concentration determination addition target determination unit 206 determines whether any one of certainties contained in the one or more pieces of estimation addition data acquired in step S1102 is less than or equal to a second threshold value. In a case where the concentration determination addition target determination unit 206 determines that there is estimation addition data containing a certainty that is less than or equal to the second threshold value (YES in step S1103), the processing proceeds to step S1104. On the other hand, in a case where all the certainties contained in the estimation addition data are greater than the second threshold value (NO in step S1103), the process ends. The second threshold value, for example, can be a value preset by the user, or a trend of the probabilities contained in estimation addition data for the addition targets managed by the addition target management unit 201 can be used. The trend of the probabilities is, for example, use of an average of the probabilities.

As described above, the information processing apparatus 100 determines whether there is a decrease in concentration using the addition target for which the certainty of the estimated annotation is low, i.e., the addition target that is likely to need a check and a modification by the operator. Thus, in a case where the concentration of the operator is low, the operator is likely to approve the estimated annotation without a modification, so that the decrease in concentration is detected with great accuracy.

In step S1104, the concentration determination addition target determination unit 206 sets the concentration determination flag to the addition target, and the process ends. In a case where the addition target management unit 201 manages addition targets using a database, the concentration determination flag can be used as a column of the database, or in a case where an addition target is a file, the concentration determination flag can be added as metadata of the file.

Steps S1101 to S1104 are executed on each addition target, and the concentration determination addition target determination unit 206 executes steps S1101 to S1104 on every one of the addition targets managed by the addition target management unit 201.

Figure 12:
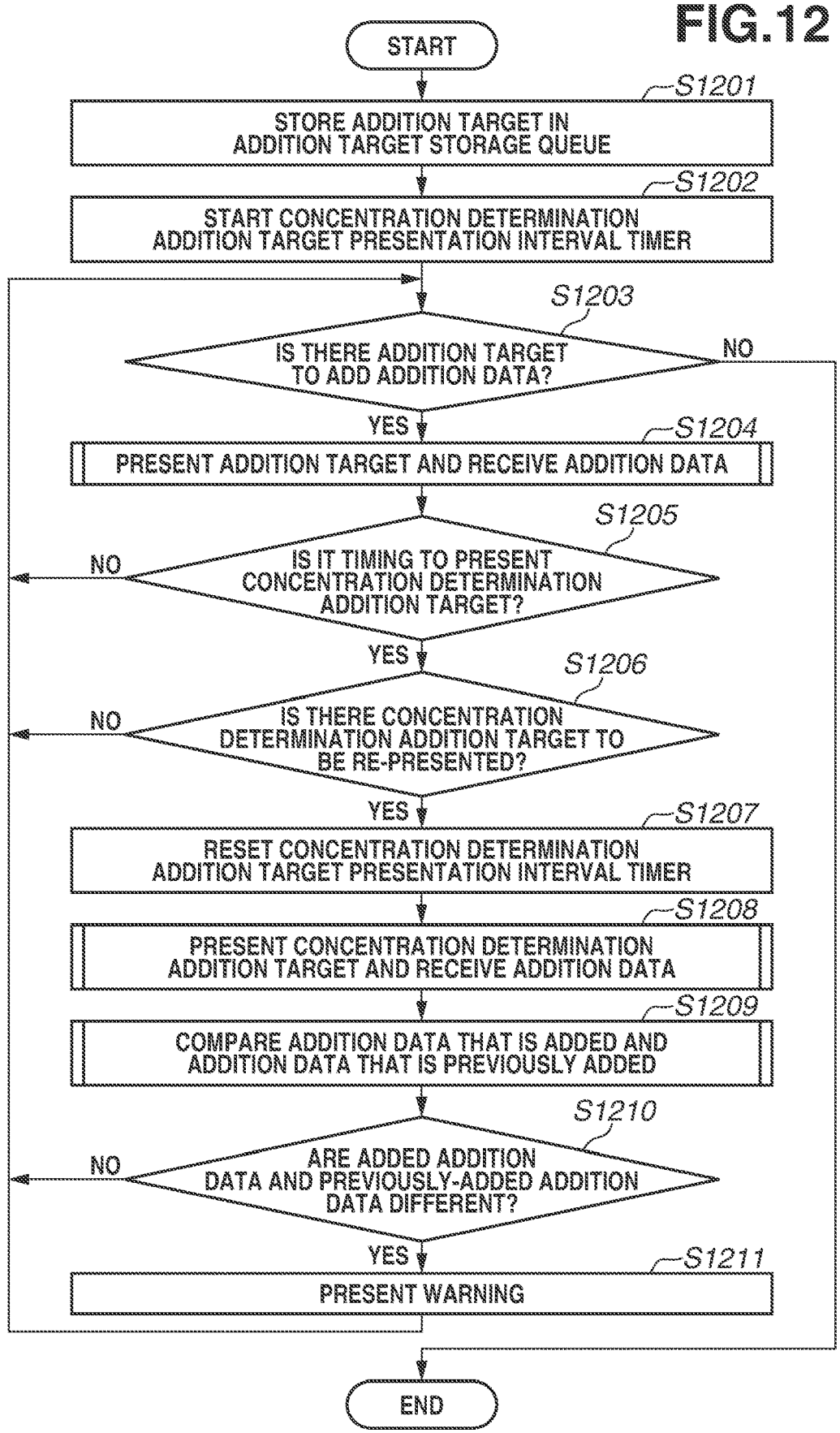
FIG. 12 is a flowchart illustrating an entire process of the information processing apparatus according to one embodiment.

Next, a comprehensive process of the information processing apparatus 100 according to the second exemplary embodiment will be described below with reference to FIG. 12.

In step S1201, the information processing apparatus 100 stores an addition target to be operated by the operator in the addition target storage queue from among the addition targets managed by the addition target management unit 201. The addition target storage queue can be a separate addition target storage queue generated for each operator or can be a single queue for use by a plurality of operators. In the second exemplary embodiment, the information processing apparatus 100 does not store an addition target in the concentration determination addition target storage queue at the start of the process, this is because the addition target that has the concentration determination flag and is presented once or more than once to the operator is determined as the concentration determination addition target in the second exemplary embodiment. Details of the process of storing an addition target in the concentration determination addition target storage queue will be described below with reference to FIG. 13.

In step S1202, the information processing apparatus 100 starts the concentration determination addition target presentation interval timer to acquire an elapsed time from the presentation of the concentration determination addition target. The timer is a timer for not re-executing the process of determining a decrease in concentration until a predetermined time period passes.

In step S1203, the information processing apparatus 100 checks whether there is an addition target in the addition target storage queue managed by the addition target management unit 201. In a case where there is an addition target (YES in step S1203), the processing proceeds to step S1204. On the other hand, in a case where there is not an addition target (NO in step S1203), the process ends.

In step S1204, the information processing apparatus 100 presents the addition target and receives addition data input by the operator. Details of this process will be described below with reference to FIG. 13.

In step S1205, the information processing apparatus 100 determines whether it is a timing for the presentation timing determination unit 207 to present the concentration determination addition target. Details thereof will be described below with reference to FIG. 15. In a case where the information processing apparatus 100 determines that it is a timing of presentation (YES in step S1205), the processing proceeds to step S1206. On the other hand, in a case where the information processing apparatus 100 determines that it is not a timing of presentation (NO in step S1205), the processing proceeds to step S1203.

In step S1206, the information processing apparatus 100 checks whether there is a concentration determination addition target in the concentration determination addition target storage queue managed by the addition target management unit 201. In a case where the information processing apparatus 100 determines that there is a concentration determination addition target (YES in step S1206), the processing proceeds to step S1207. On the other hand, in a case where the information processing apparatus 100 determines that there is not a concentration determination addition target (NO in step S1206), the processing proceeds to step S1203.

In step S1207, the concentration determination addition target presentation interval timer started in step S1202 is reset.

In step S1208, the information processing apparatus 100 presents the concentration determination addition target and receives addition data input by the operator. The processing of step S1204 and the processing of step S1208 are basically the same except that different addition targets are presented to the operator. Specifically, the normal addition target is presented in step S1204 whereas the concentration determination addition target is presented in step S1208. Further, the normal addition target and the concentration determination addition target can be treated as the same addition target for the operator. Details of the process will be described below together with step S1204 with reference to FIG. 13.

In step S1209, the information processing apparatus 100 compares the addition data added in step S1208 and the addition data that is previously added to the same addition target. The comparison process will be described below with reference to FIG. 16.

In step S1210, in a case where the information processing apparatus 100 determines that the added addition data and the previously-added addition data are different as a result of the comparison in step S1209 (YES in step S1210), the processing proceeds to step S1211. On the other hand, in a case where the information processing apparatus 100 determines that the added addition data and the previously-added addition data are the same (NO in step S1210), the processing proceeds to step S1203.

In step S1211, the information processing apparatus 100 presents an attention attraction and a warning using the addition target presentation unit 202 to inform the operator that there is a decrease in concentration. The forms of the warning in step S1211 are similar to those in step S510 described above.

Figure 13:
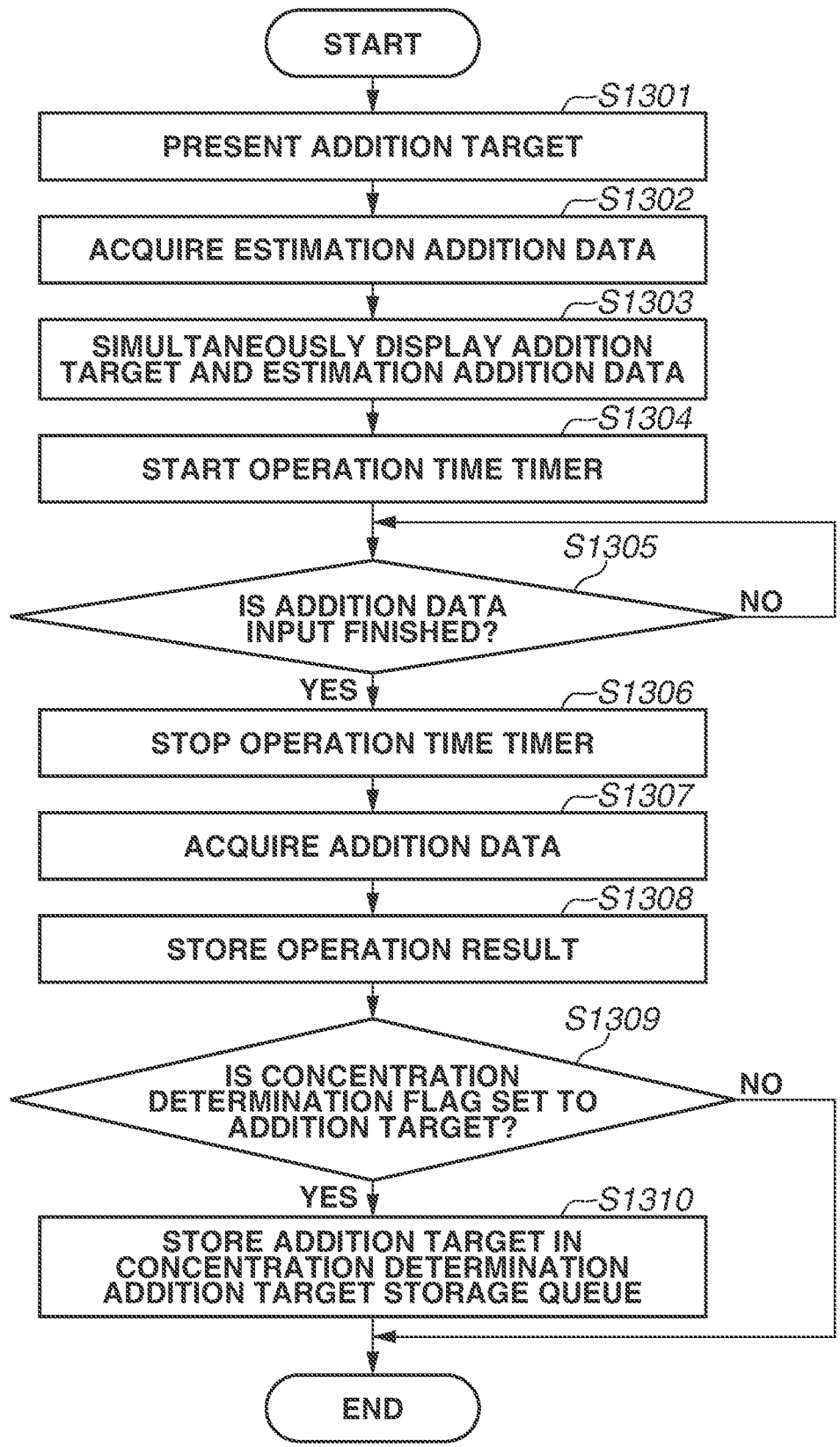
FIG. 13 is a flowchart illustrating a process of receiving addition data according to one embodiment.

Next, the process of presenting the addition target and receiving the addition data input by the operator will be described below with reference to FIG. 13.

In step S1301, the information processing apparatus 100 acquires the addition target from the addition target management unit 201 and displays the addition target on the addition target presentation unit 202 to the operator. In acquiring the addition target from the addition target management unit 201, the information processing apparatus 100 acquires the addition target from the addition target storage queue in a case where the addition target to be acquired is the normal addition target, or the information processing apparatus 100 acquires the addition target from the concentration determination addition target storage queue in a case where the addition target to be acquired is the concentration determination addition target.

In step S1302, the information processing apparatus 100 acquires the estimation addition data estimated for the addition target acquired in step S1301 by the addition data estimation unit 205 from the operation result storage unit 204. In a case where there is a plurality of pieces of estimation addition data for the addition target, all the pieces of estimation addition data are acquired. Specifically, in a case where the addition target is an image and there is a plurality of estimation regions for the image, all of a plurality of pieces of estimation addition data about the plurality of estimation regions are acquired.

In step S1303, the information processing apparatus 100 displays the estimation addition data acquired in step S1302 using the addition target presentation unit 202 simultaneously with displaying the addition target acquired in step S1301 using the addition target presentation unit 202 to the operator as illustrated in FIGS. 10A to 10C.

In step S1304, the information processing apparatus 100 starts an operation time timer using the operation time measurement unit 901 to measure the operation time of the operator.

In step S1305, the information processing apparatus 100 determines whether addition data input by the operator is finished. In a case where input is finished (YES in step S1305), the processing proceeds to step S1306. On the other hand, in a case where input is not finished (NO in step S1305), the determination is repeated until input is finished.

In step S1306, the information processing apparatus 100 stops the operation time timer started in step S1304.

In step S1307, the information processing apparatus 100 acquires the addition data input by the operator using the addition data input unit 203.

In step S1308, the information processing apparatus 100 stores the addition target presented in step S1301, the addition data acquired in step S1307, and the elapsed time obtained by stopping the timer in step S1306 in association as an operation result in the operation result storage unit 204. An example of operation result data will be described below with reference to FIGS. 14A to 14D.

In step S1309, the information processing apparatus 100 determines whether the concentration determination flag is set to the addition target presented in step S1301. In a case where the concentration determination flag is set (YES in step S1309), the processing proceeds to step S1310. On the other hand, in a case where the concentration determination flag is not set (NO in step S1309), the process ends.

In step S1310, the information processing apparatus 100 stores the addition target presented in step S1301 in the concentration determination addition target storage queue in the addition target management unit 201.

Examples of the estimation addition data and the operation result data will be described below with reference to FIGS. 14A to 14D.

FIGS. 14A, 14B, 14C, and 14D illustrate an example of a table of a database in the operation result storage unit 204.

An addition target storage table 1410 illustrated in FIG. 14A contains three columns. Further, each addition target is represented by a single row of the addition target storage table 1410. A column 1411 stores IDs for identifying images that are addition targets. A column 1412 stores file paths of the images. A column 1413 stores the concentration determination flags each indicating whether the corresponding addition target is for a concentration determination.

An estimation addition data storage table 1420 illustrated in FIG. 14B contains five columns. Further, each piece of estimation addition data is represented by a single row of the estimation addition data storage table 1420. A column 1421 stores IDs for identifying estimation results. A column 1422 stores the estimation results. A column 1423 stores certainty information about the estimation results. A column 1424 stores IDs of images that are estimation targets. A column 1425 stores IDs of regions contained in the images that are estimation targets. The regions are managed by a region table 1440 described below.

An addition data storage table 1430 illustrated in FIG. 14C contains six columns. Further, each piece of addition data is represented by a single row of the addition data storage table 1430. A column 1431 stores IDs for identifying addition data. A column 1432 stores addition results. A column 1433 stores the start date/time of the operation of adding the addition data. A column 1434 stores the end date/time of the operation of adding the addition data. A column 1435 stores IDs for identifying images that are estimation targets. A column 1436 stores IDs of regions contained in the images that are addition targets. The regions are managed by the region table 1440 described below.

The region table 1440 illustrated in FIG. 14D contains five columns. Further, each region in an addition target is represented by a single row of the region table 1440. A column 1441 stores IDs for identifying the regions. A column 1442 stores X-coordinate values of starts points that are the upper left points of the regions. A column 1443 stores Y-coordinate values of the start points that are the upper left points of the regions. A column 1444 stores values of the widths of the regions. A column 1445 stores values of the heights of the regions.

Figure 15:
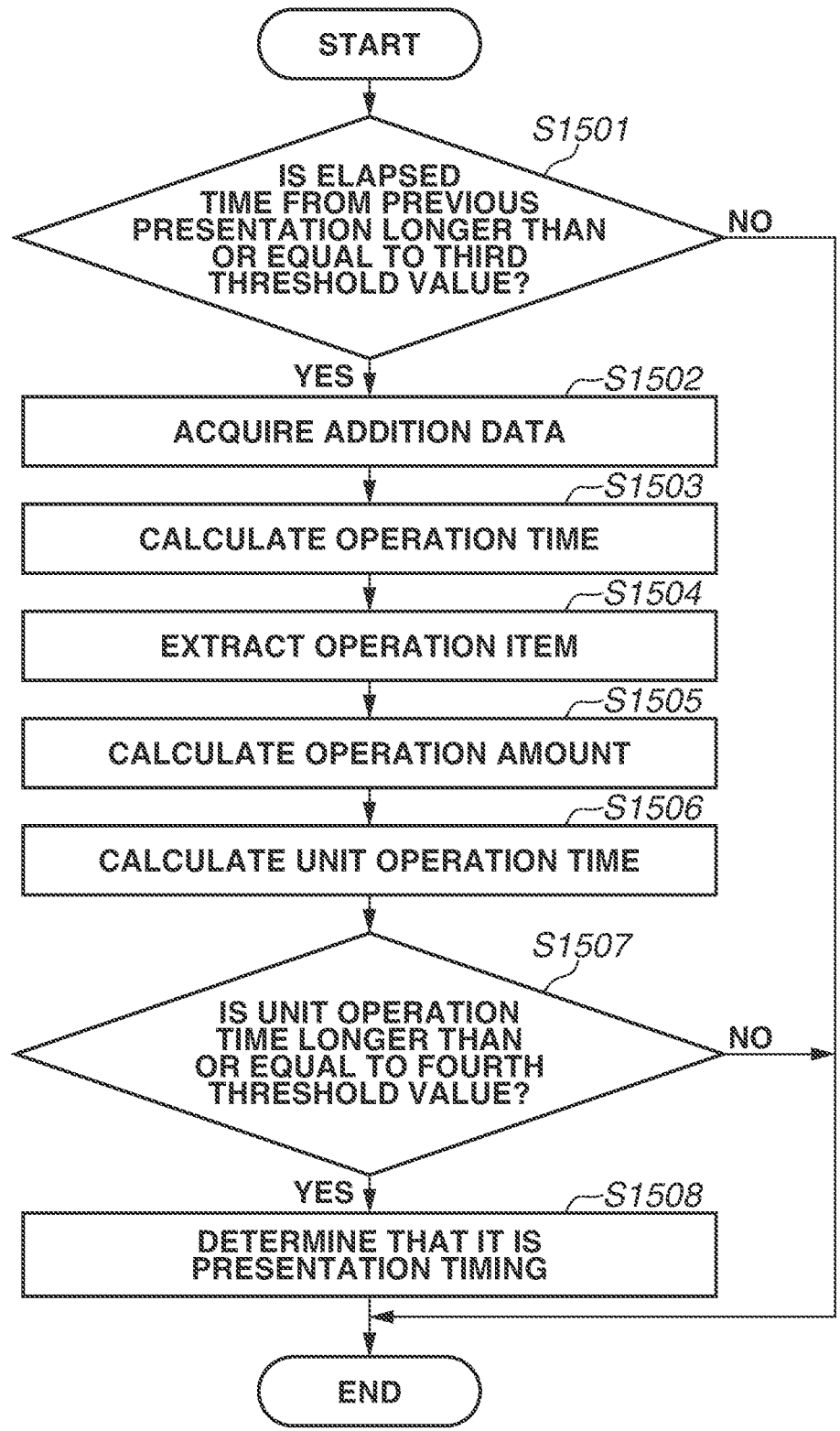
FIG. 15 is a flowchart illustrating a process of determining a timing to re-display an addition target that is previously presented once according to one embodiment.

Next, the process of determining a timing to present the concentration determination addition target by the presentation timing determination unit 207 according to the second exemplary embodiment will be described below with reference to FIG. 15.

In step S1501, the information processing apparatus 100 determines whether the elapsed time from the previous display of the concentration determination addition target is longer than or equal to a third threshold value. In a case where the elapsed time is longer than or equal to the third threshold value (YES in step S1501), the processing proceeds to step S1502. On the other hand, in a case where the elapsed time is less than the third threshold value (NO in step S1501), the process ends. The third threshold value is set not to continuously present the concentration determination addition target to the operator. In a case where the concentration determination addition target is to be displayed frequently, the third threshold value can be set to zero such that the determination is not executed as a matter of practice.

In step S1502, the information processing apparatus 100 acquires the newest addition data as a result of the operation by the operator. This will be described below with reference to the data illustrated in FIGS. 14A to 14D as an example. The information processing apparatus 100 acquires a row with an ID of the column 1435 that is the same as the ID of the addition target operated by the operator, with the start date/time of the column 1433 and the end date/time of the column 1434 that are the same, and with the newest start date/time of the column 1433 from the addition data storage table 1430. In the addition data storage table 1430 illustrated as an example in FIG. 14C, the two rows of the IDs "J" and "J+1" in the column 1431 are the rows that match.

In step S1503, the information processing apparatus 100 computes the operation time by subtracting the start date/time of the column 1433 from the end date/time of the column 1434 of the addition data acquired in step S1502. In the example of the addition data storage table 1430 illustrated in FIG. 14C, the operation time is 88 seconds obtained by subtracting Dec. 17, 2019, 11:23:52 from Dec. 17, 2019, 11:25:20.

In step S1504, the information processing apparatus 100 extracts an operation item from the addition data that is an operation result and is acquired in step S1502. The operation item is, for example, the labeling and the region designation. In the example illustrated in FIG. 14C, in a case where at least one of the one or more extracted rows stores a value in the column 1432, the labeling is extracted as the operation item. Next, in a case where at least one of the one or more extracted rows stores a value in the column 1436, the region designation is extracted as the operation item. While the labeling and the region designation are described as an example in the present exemplary embodiment, the operation item is not limited to those described above. For example, in a case where the addition target is a moving image, the designation of a section of the moving image can be the operation item, or in a case where the addition target is a character string, the designation of a delimiter of each clause can be the operation item.

In step S1505, the information processing apparatus 100 computes an operation amount by combining the number of pieces of addition data added to the addition target and a weight corresponding to the operation item extracted in step S1504. This will be described below with reference to the data in FIGS. 14A to 14D. First, the number of pieces of addition data is two based on the addition data acquired in step S1502. Thereafter, the number is multiplied by the weight corresponding to the operation item extracted in step S1504. Specifically, in a case where the weight of the labeling is one and the weight of the region designation is three, the operation amount necessary for generating addition data is four, which is obtained by adding the weight of the labeling, i.e., one, and the weight of the region designation, i.e., three per piece of addition data. Since there are two pieces of addition data, the operation amount is calculated by 4×2=8.

In step S1506, the information processing apparatus 100 divides the operation time calculated in step S1503 by the operation amount calculated in step S1505 to obtain a unit operation time. In the example illustrated in FIGS. 14A to 14D, since the operation time is 88 seconds and the operation amount is 8, the unit operation time is 11 seconds.

In step S1507, the information processing apparatus 100 determines whether the unit operation time calculated in step S1506 is longer than or equal to a fourth threshold value. Further, one fourth threshold value can be set for the entire system, or the fourth threshold value can be preset for each operator. Further, the unit operation time of each operation can be calculated, and the average or median value of the calculated unit operation times can be used. In a case where the unit operation time is longer than or equal to the fourth threshold value (YES in step S1507), the processing proceeds to step S1508. On the other hand, in case where the unit operation time is less than the fourth threshold value (NO in step S1507), the process ends.

In step S1508, since the information processing apparatus 100 determines that the unit operation time is longer than or equal to the fourth threshold value in step S1507, the information processing apparatus 100 determines that there is a possibility that the operator is less directed to the operation than usual, and the information processing apparatus 100 determines that it is a timing to present the concentration determination addition target. Specifically, the information processing apparatus 100 determines the operation efficiency based on the operation time of the operation of adding an annotation by the operator, and in a case where there is a decrease in operation efficiency, the information processing apparatus 100 determines whether there is a decrease in concentration. Thereby. by providing the warning as needed in a case where the concentration starts decreasing, errors in the process of adding an annotation are prevented beforehand.

Figure 16:
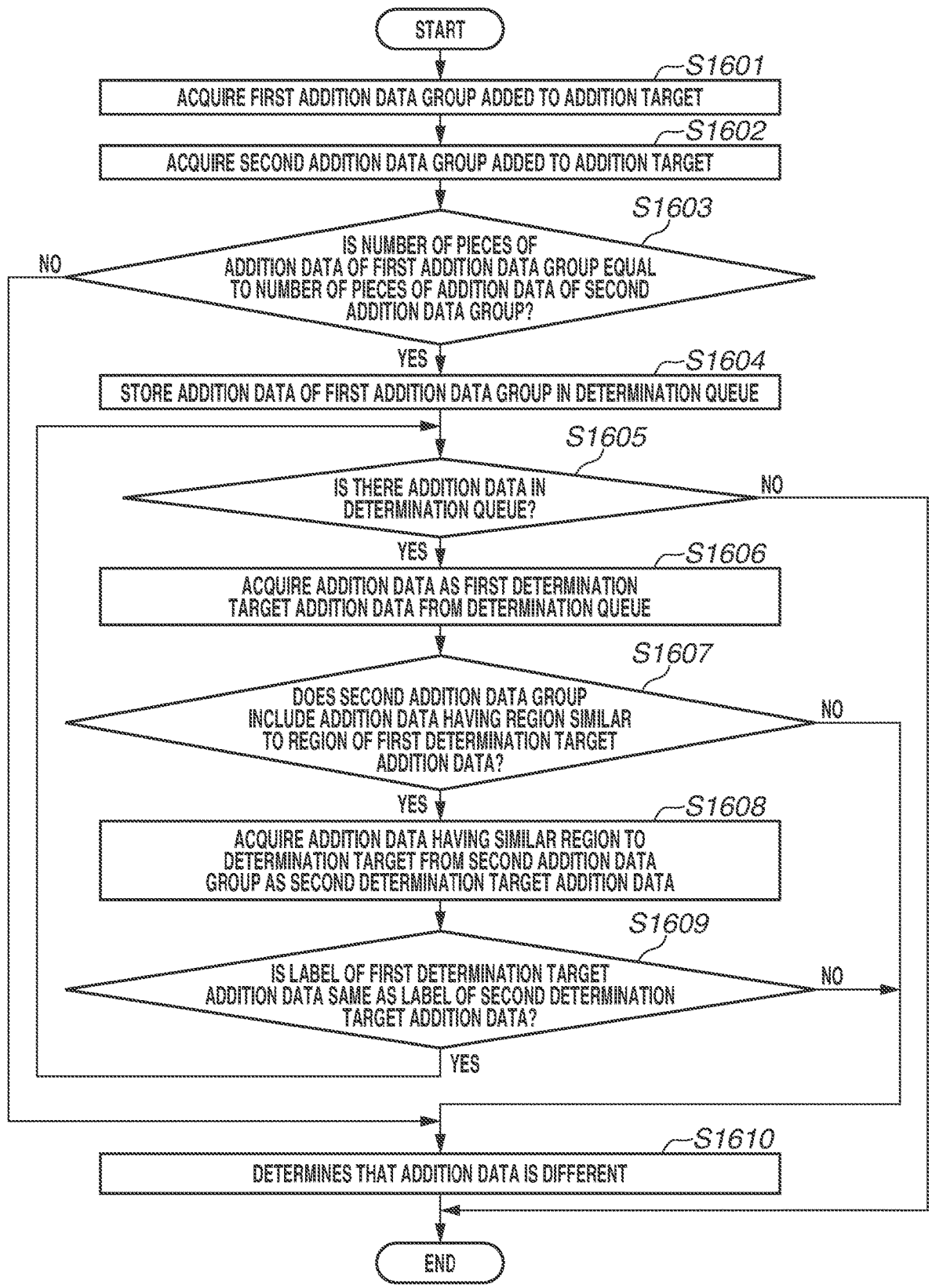
FIG. 16 is a flowchart illustrating a process of determining whether there is a decrease in concentration according to one embodiment.

Next, the process of determining whether there is a decrease in concentration according to the second exemplary embodiment will be described below with reference to FIG. 16.

In step S1601, the information processing apparatus 100 acquires a first addition data group added to the addition target from the operation result storage unit 204. The first addition data is data recently added by the operator and is addition data added to the addition target presented as the concentration determination addition target.

The examples of the data illustrated FIGS. 14A to 14D will be described below as a reference. For description, it is assumed that the current time is Dec. 16, 2019, 15:36:12 and that the newest pieces of data in the addition data storage table 1430 in FIG. 14C are the data up to the data of the ID "I+1". Based on the assumption, a row with an ID of the column 1435 that is the same as the ID of the addition target operated by the operator, with the start date/time of the column 1433 and the end date/time of the column 1434 that are the same, and with the newest start date/time of the column 1433 is acquired from the addition data storage table 1430. In the addition data storage table 1430 illustrated as an example in FIG. 14C, the two rows of the IDs "I" and "I+1" in the column 1431 are the rows that match.

In step S1602, the information processing apparatus 100 acquires a second addition data group added to the addition target from the operation result storage unit 204. The second addition data is data previously added by the operator and is addition data added to the addition target presented as a normal addition target. The examples of the data illustrated FIGS. 14A to 14D will be described below as a reference. For description, it is assumed that the time is Dec. 16, 2019, 15:36:12 as in step S1601. Further, there are the pieces of data up to the data with the ID "I+1" in the addition data storage table 1430 illustrated in FIG. 14C, and there are only four pieces of addition data added to an image ID1 that are the pieces of data with the IDs "1", "2", "I", and "I+1".

A row with an ID of the column 1435 that is the same as the ID of the addition target operated by the operator, with the start date/time of the column 1433 and the end date/time of the column 1434 that are the same, and with the newest start date/time of the column 1433 is acquired from the addition data storage table 1430. In the addition data storage table 1430 illustrated as an example in FIG. 14C, the two rows of the IDs "1" and "2" in the column 1431 are the rows that match.

In step S1603, the information processing apparatus 100 determines whether the number of pieces of addition data contained in the first addition data group acquired in step S1601 is the same as the number of pieces of addition data contained in the second addition data group acquired in step S1602. In a case where the numbers are the same (YES in step S1603), the processing proceeds to step S1604. On the other hand, in a case where the numbers are different (NO in step S1603), the processing proceeds to step S1610. In the example illustrated in FIGS. 14A to 14D, the number of pieces of data contained in the first addition data group is two, and the number of pieces of data contained in the second addition data group is also two, so that the numbers are the same.

In step S1604, the information processing apparatus 100 stores the addition data contained in the first addition data group acquired in step S1601 in the determination queue.

In step S1605, the information processing apparatus 100 determines whether there is addition data in the determination queue. In a case where there is addition data in the determination queue (YES in step S1605), the processing proceeds to step S1606. On the other hand, in a case where there is not addition data in the determination queue (NO in step S1605), the process ends.

In step S1606, the information processing apparatus 100 acquires the addition data as first determination target addition data from the determination queue.

In step S1607, the information processing apparatus 100 determines whether the second addition data group includes addition data having region information similar to region information of the first determination target addition data acquired in step S1606. In a case where the second addition data group includes such addition data (YES in step S1607), the processing proceeds to step S1608. On the other hand, in a case where the second addition data group does not include such addition data (NO in step S1607), the processing proceeds to step S1610. Whether regions are similar is determined based on whether four pieces of information that are the X- and Y-coordinates, widths, and heights of the start points that are the upper left points of the regions and define the regions are within a predetermined value range.

The examples of the data illustrated FIGS. 14A to 14D will be described below as a reference. In the foregoing descriptions, the addition data with the ID "1" and the addition data with the ID "2" in the addition data storage table 1430 are of the first addition data group, and the addition data with the ID "I" and the addition data with the ID "I+1" in the addition data storage table 1430 are of the second addition data group. In a case where the addition data with the ID "1" among the first addition data group is the first determination target addition data, since the region ID of the addition data with the ID "1" is L, region data with the ID "L" in the region table 1440 is referred to. The region data with the ID "L" specify that the X-coordinate of the start point is 8, the Y-coordinate of the start point is 14, the width is 489, and the height is 294. Next, the four values are each compared with those of the addition data of the second addition data group. First, since the region ID of the addition data with the ID "I" in the second addition data group is M, the region M is checked. The X-coordinate of the start point of the region M is 12, the Y-coordinate of the start point is 15, the width is 492, and the height is 297. In a case where a tolerance of ±10 is set for the four values of the X- and Y-coordinates of the start point, the width, and the height as a condition for being similar, it can be determined that the region with the ID "L" and the region with the ID "M" are similar. While the tolerance is set to ±10, the tolerance is not limited to that described above.

As described above, in a case where a comparison result indicates that the previously-input annotation being the comparison target and the annotation input recently by the operator are added to different regions, the information processing apparatus 100 determines that there is a decrease in concentration of the operator.

In step S1608, the information processing apparatus 100 acquires the addition data determined as having a similar region in step S1607 as second determination target addition data. In the examples of data illustrated in FIGS. 14A to 14D, the addition data that has the ID "I" and contains the region with the ID "M" determined as a similar region is the second determination target addition data.

In step S1609, the information processing apparatus 100 determines whether a label of the first determination target addition data is the same as a label of the second determination target addition data. In a case where the labels are the same (YES in step S1609), the processing proceeds to step S1605. On the other hand, in a case where the labels are different (NO in step S1609), the processing proceeds to step S1610. In the above descriptions of the examples, the label of the first determination target addition data is "ordinary vehicle", and the label of the second determination target addition data is also "ordinary vehicle", so that the labels are determined as being the same.

In the above-described configuration, in a case where the previously-input annotation and the recently-input annotation do not match in step S1609, it is determined that the pieces of addition data are different and there is a decrease in concentration. The configuration, however, is not limited to that described above. For example, in a case where the previously-input annotation and the recently-input annotation are synonyms or are a broader concept and a narrower concept, it can be determined that the pieces of addition data are the same and there is not a decrease in concentration.

In step S1610, the information processing apparatus 100 determines that the addition data is different.

By the above-described process, whether the addition data added a plurality of times to the same addition target by the operator is different is determined. Even in a case where the addition data is added a plurality of times, the added addition data should be the same, but in a case where the added addition data differs, it can be determined that the operator fails to perform determination as usual. Thus, it is determined that there is a decrease in concentration of the operator. Then, a warning of the decrease in concentration is provided to prompt the operator to take a rest so that an error that can occur as a result of forcedly performing the operation when the concentration decreases is prevented.

According to each of the above-described exemplary embodiments, when the operator performs the operation of adding information to the addition target, whether there is a decrease in recognition accuracy of the operator is determined based on results of the operation by the operator, and in a case where there is a decrease in recognition accuracy, the warning is provided. When receiving the warning, the operator can stop the operation and take a rest and then perform the operation in a concentrated state again to prevent operational errors. Furthermore, since the determination of whether there is a decrease in recognition accuracy of the operator does not require use of an apparatus that has no close relationship with the actual operation, an increase in costs is significantly reduced.

A third exemplary embodiment will be described below. Classification by adding an annotation or a tag to a target is widely performed. In recent years, annotation addition and tagging are not only used in classification for organizing but also used as supervisory data in machine learning.

Especially in a case of classification as supervisory data for machine learning, since the amount of addition targets is significant, the operation is sometimes performed by a plurality of operators sharing references for annotations and tags.

Japanese Patent Application Laid-Open No. 2015-166975 discusses a method for adding annotations by a plurality of operators. In this method, the reliability of each of the plurality of operators is determined based on results of annotations added by the operator, and an addition target to be assigned to the operator is determined based on the reliability.

In a case where annotations are to be added by a plurality of operators, if an addition reference varies between the operators, different annotations may be added to the same target. In a case where different annotations are added to the same target, a trained model with high accuracy may not be generated by machine learning using the annotations as supervisory data.

A technique for solving the issue will be described below. In the following exemplary embodiment, a variation in the addition reference between the plurality of operators in the operation of adding annotations is detected, and a warning about the variation in the addition reference can be provided.

An apparatus configuration according to the present exemplary embodiment is similar to that in the first exemplary embodiment.

The information processing apparatus 100 according to the present exemplary embodiment is an apparatus that adds an annotation such as a name and an explanation of an object contained in an addition target (e.g., content such as an image or a sentence) to the addition target. Further, the information processing apparatus 100 performs detection of a difference and a variation in the addition reference between the plurality of operators performing the operation of adding annotations, and in a case where the information processing apparatus 100 detects a difference or a variation in the addition reference, the information processing apparatus 100 provides a warning and/or an attention attraction.

Figure 17:
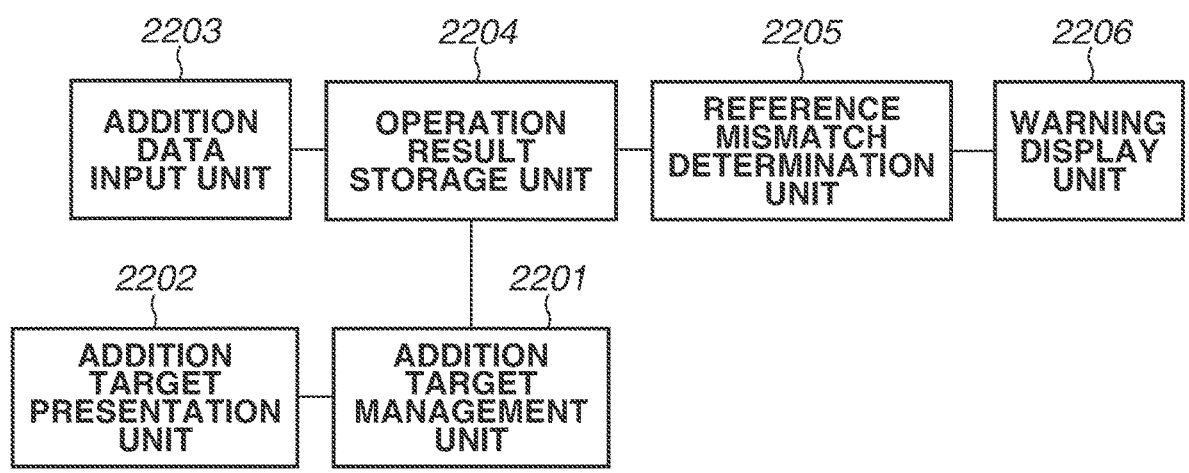
FIG. 17 is a diagram illustrating a functional configuration of the information processing apparatus according to one embodiment.

A functional configuration of the information processing apparatus 100 according to the present exemplary embodiment will be described below with reference to FIG. 17. The CPU 101 reads a program stored in the ROM 102 or the external storage apparatus 104 and executes the read program to calculate information, process information, and control the hardware, whereby the functional configuration described below is realized. Each functional configuration can be realized by hardware such as an ASIC and a FPGA.

The information processing apparatus 100 according to the present exemplary embodiment includes an addition target management unit 2201 and an addition target presentation unit 2202 as a unit that handles addition targets to be presented to the operators. Further, the information processing apparatus 100 includes an addition data input unit 2203, an operation result storage unit 2204, and a reference mismatch determination unit 2205 as a unit that processes the operation of adding information to addition targets by the operators and operation results. The information processing apparatus 100 further includes a warning display unit 2206 as a unit that provides a warning about a difference in the addition reference between the operators.

The addition target management unit 2201 manages addition targets to which the operators are to add information. The addition targets are specifically an image, a moving image, a character string that forms a natural language such as a sentence, and a file. Hereinafter, an image will be described as an example of an addition target.

The addition target presentation unit 2202 presents the addition targets managed by the addition target management unit 2201 to the operators.

Figure 18A:
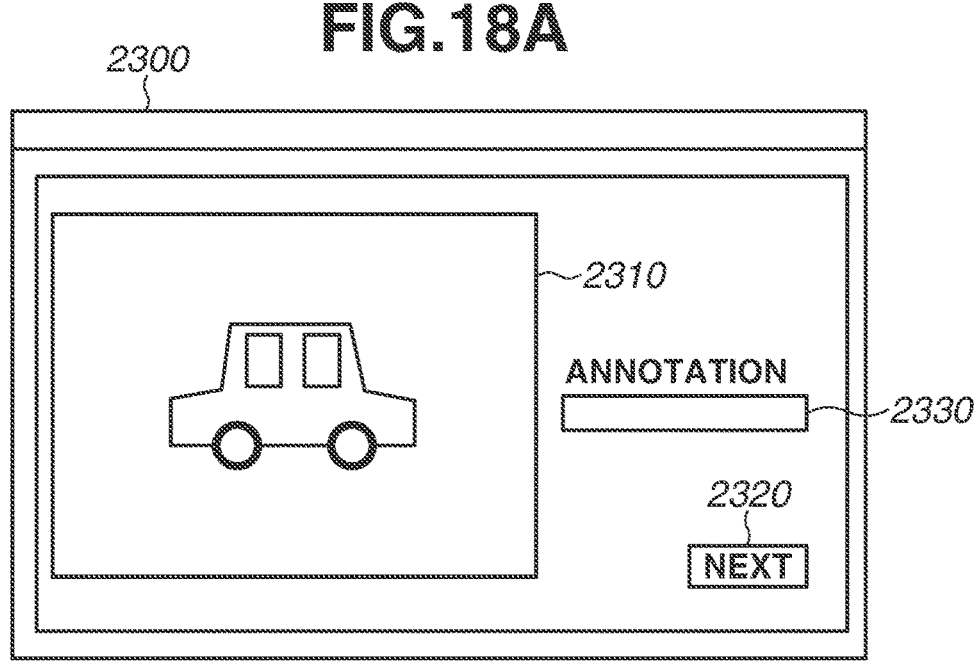
FIGS. 18A and 18B are diagrams illustrating an example of a screen that is output by the information processing apparatus according to one embodiment.

The addition data input unit 2203 receives input addition data to be added to the addition targets presented by the addition target presentation unit 2202. FIG. 18A illustrates an example of a user interface that is presented to the operators. An addition target presentation window 2300 includes an addition target display region 2310, an addition target selection button 2320, and an addition data input region 2330. The addition target presentation unit 2202 corresponds to the addition target display region 2310 and the addition target selection button 2320, and the addition data input unit 203 corresponds to the addition data input region 2330.

The operation of adding addition data to a single addition target by an operator includes checking an addition target displayed on the addition target display region 2310 and inputting annotation information to be added to the addition target to the addition data input region 2330. In a case where input is finished, the addition target displayed on the addition target display region 2310 is changed using the addition target selection button 2320, and the operation is repeated until an operation queue described below no longer contains an addition target.

Figure 18B:
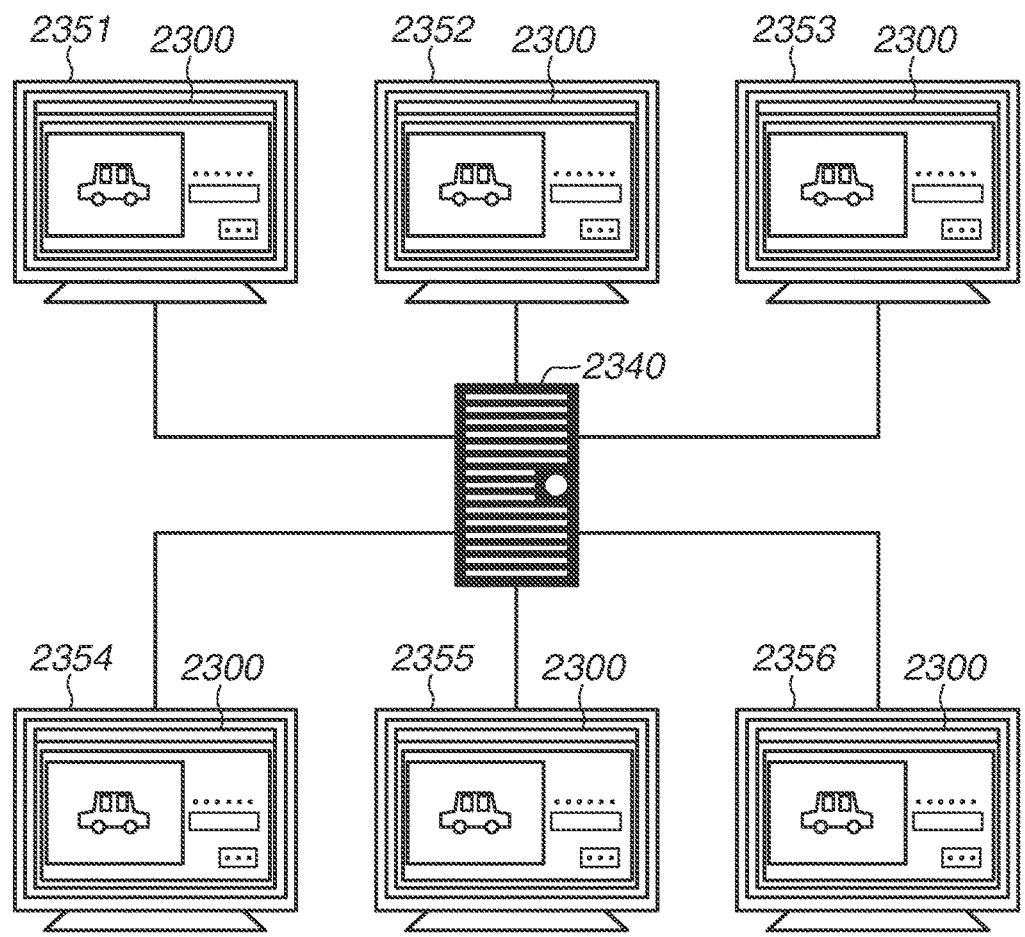

Further, FIG. 18B illustrates an example where a user interface is presented to a plurality of operators. In the example illustrated in FIG. 18B, six operators perform the addition operation. The respective operators operate the addition target presentation window 2300 using clients 2351, 2352, 2353, 2354, 2355, and 2356. The six clients 2351 to 2356 are connected to a server 2340 and receive an addition target from the server 2340 and display the received addition target. The clients 2351 to 2354 and the server 2340 each have a configuration similar to that of the information processing apparatus 100.

The operation result storage unit 2204 stores the addition target presented by the addition target presentation unit 2202 in association with the addition data input via the addition data input unit 2203.

The reference mismatch determination unit 2205 determines whether there is a variation between pieces of addition data added by a plurality of operators and determines whether there is a reference mismatch between the operators.

In a case where the reference mismatch determination unit 2205 determines that there is a reference mismatch between the operators, the warning display unit 2206 displays a warning to the operators, an inspector inspecting the results of addition by the operators, and a supervisor supervising the operators.

Figure 19A:
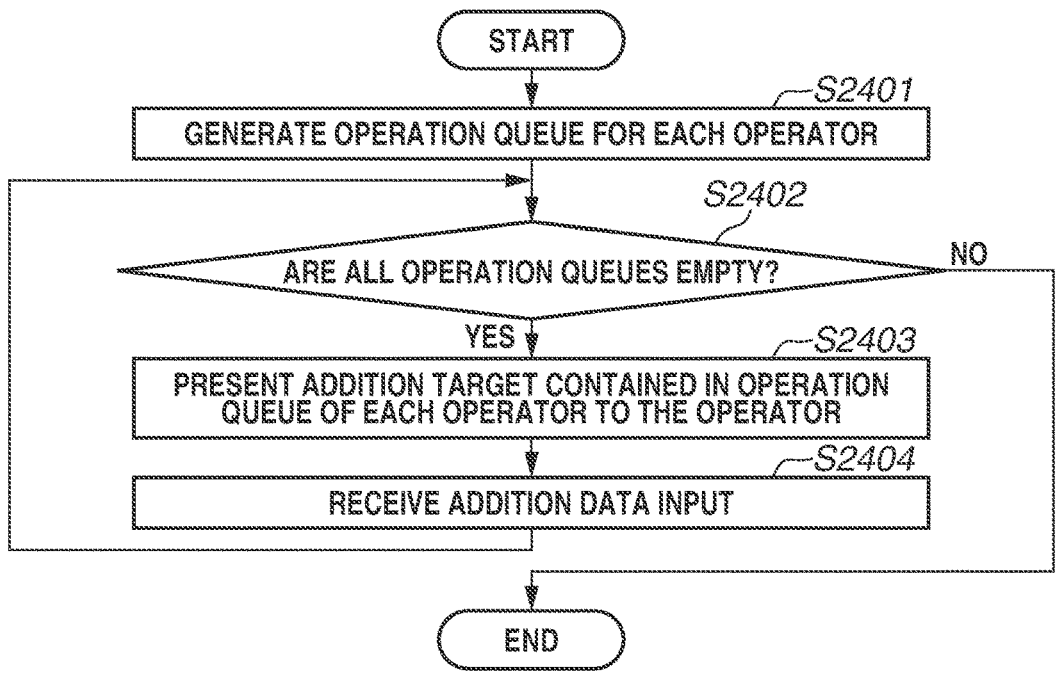
FIGS. 19A and 19B are flowcharts illustrating an entire process of an information processing apparatus according to one embodiment.
Figure 19B:
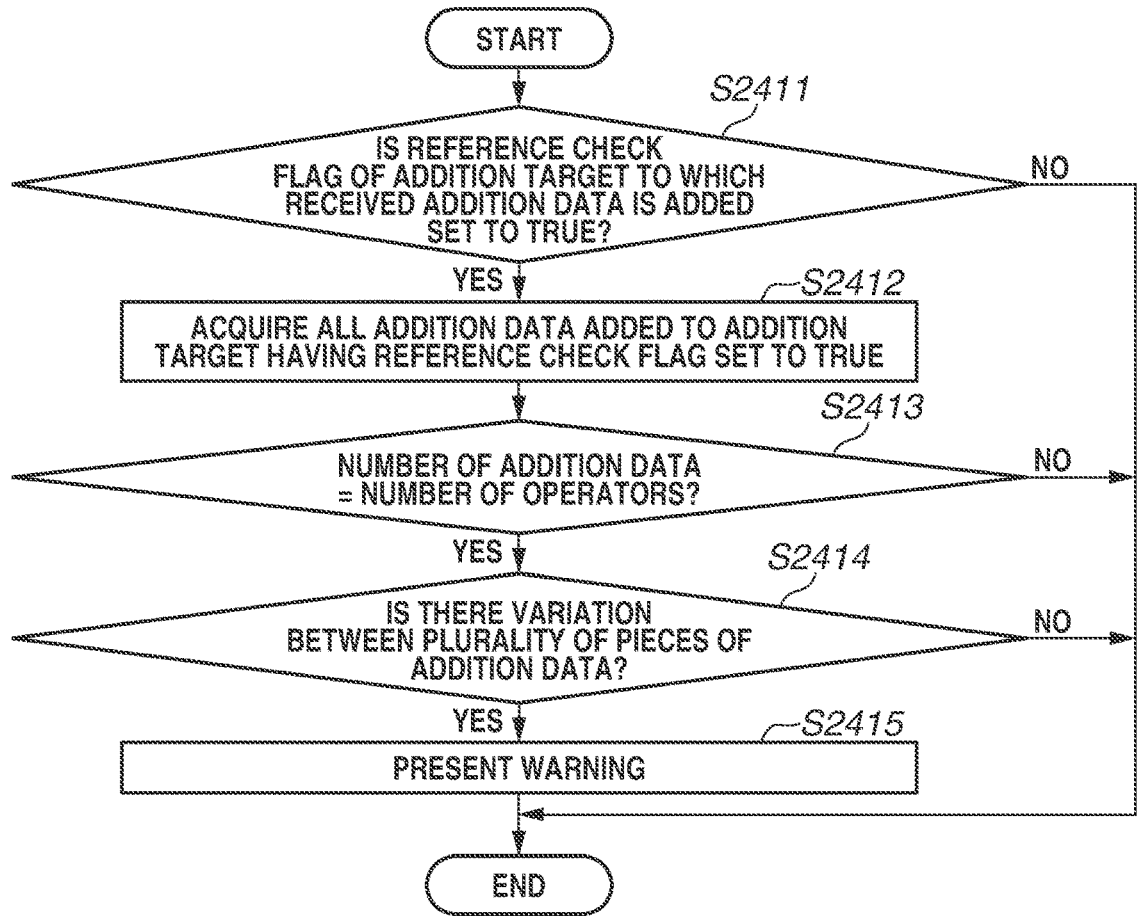

Next, an entire process according to the third exemplary embodiment will be described below with reference to FIGS. 19A and 19B. FIGS. 19A and 19B illustrate two flowcharts. FIG. 19A illustrates steps S2401 to S2404 of a process of presenting an addition target to the operators and receiving a result thereof. Further, FIG. 19B illustrates steps S2411 to S2415 of an event-driven process of determining whether there is a reference mismatch when addition data input by the operators is received.

The CPU 101 reads a program stored in the ROM 102 or the external storage apparatus 104 and executes the read program to calculate information, process information, and control the hardware, whereby each step in the flowcharts illustrated in FIGS. 19A and 19B and subsequent drawings is realized. The steps in the flowcharts illustrated in FIGS. 19A and 19B and the subsequent drawings can be realized partially or entirely by a single piece of hardware or a plurality of pieces of hardware such as an ASIC and a FPGA.

First, the process illustrated in FIG. 19A will be described in detail below. Hereinafter, the information processing apparatus 100 will be described as the server 2340 illustrated in FIG. 18B.

Figure 20:
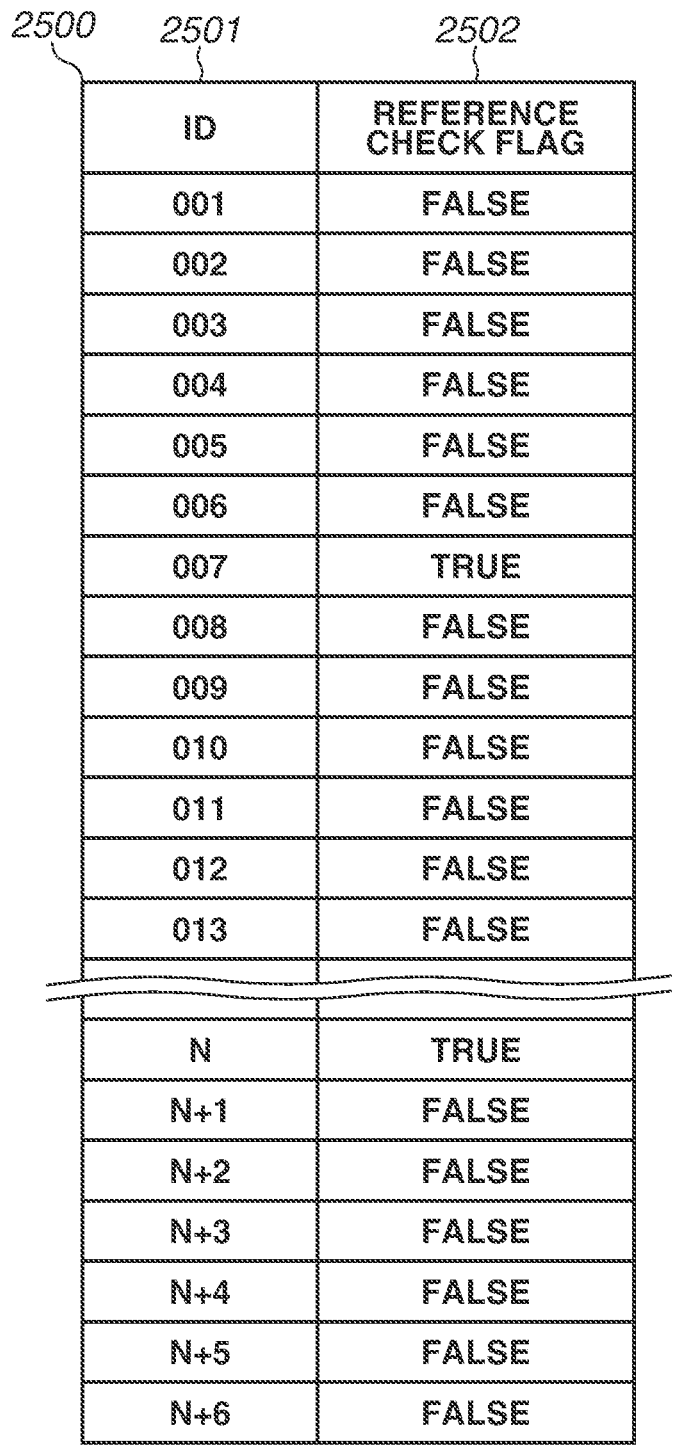
FIG. 20 is a diagram illustrating an example of a table that manages addition targets according to one embodiment.

In step S2401, the information processing apparatus 100 generates an operation queue of the addition targets managed by the addition target management unit 2201 for each operator. The addition targets managed by the addition target management unit 2201 are managed in an addition target storage table 2500 as illustrated in FIG. 20. The addition target storage table 2500 contains two columns. Further, each addition target is represented by a single row of the addition target storage table 2500. A column 2501 stores IDs for identifying the addition targets. A column 2502 stores reference check flags indicating whether each addition target can be used for reference check. The reference check flags managed in the column 2502 can be randomly determined, or designation from a user such as an inspector can be received to determine an addition target specified by the designation.

Figure 21:
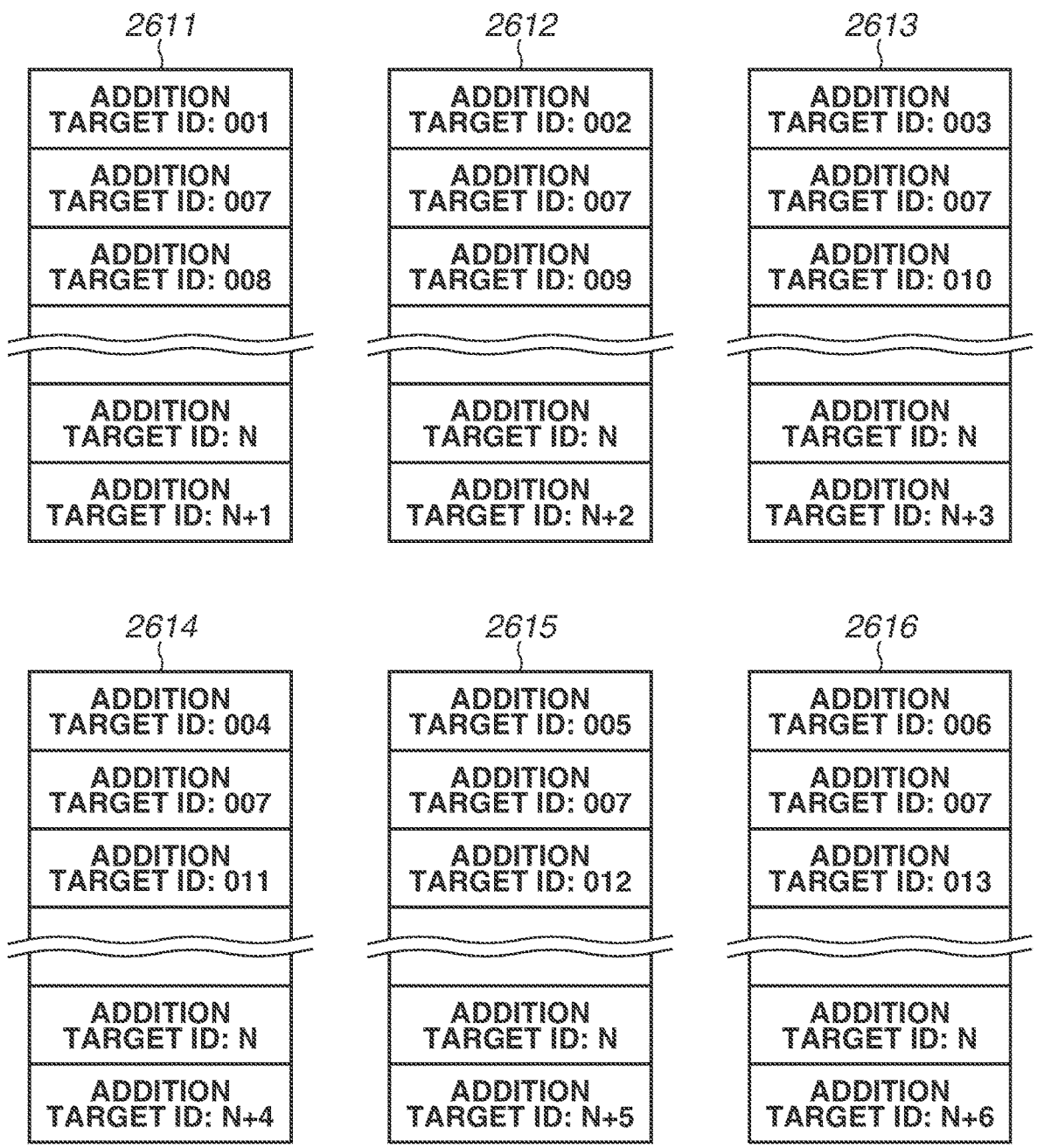
FIG. 21 is a diagram illustrating an example of an operation queue that stores addition targets for use by an operator in performing an operation according to one embodiment.

FIG. 21 illustrates an example of the operation queue in a case where the number of operators is six. Queues 2611, 2612, 2613, 2614, 2615, and 2616 respectively are for operators A, B, D, E, and F. The six queues 2611 to 2616 are used in this order from the top. The addition targets are assigned to the queues 2611 to 2616 using the information stored in the addition target storage table 2500 illustrated in FIG. 20. The addition targets with the addition target IDs 001 to 006 are separately set to the respective queues 2611 to 2616 of the operators because the reference check flag is False. Next, the addition target with the addition target ID 007 is set to each of the queues 2611 to 2616 of the operators because the reference check flag is True. Thereafter, the addition targets with the addition target IDs 008 to 013 are separately set to the respective queues 2611 to 2616 of the operators because the reference check flag is False. The foregoing process is repeated to assign the addition targets to the operation queues 2611 to 2616.

In step S2402, the addition target management unit 2201 of the information processing apparatus 100 checks whether all the operation queues 2611 to 2616 generated in step S2401 are empty. In a case where all the operation queues 2611 to 2616 are empty (YES in step S2402), the process ends. On the other hand, in a case where at least one of the operation queues 2611 to 2616 still contains an addition target (NO in step S2402), the processing proceeds to step S2403.

In step S2403, the information processing apparatus 100 acquires an addition target from the operation queues 2611 to 2616 generated in step S2401 and displays the acquired addition target on the addition target presentation unit 2202 of each operator as illustrated in FIG. 18B. Specifically, the server 2340 displays the addition target on the clients 2351 to 2356.

In step S2404, the addition data input unit 2203 of the information processing apparatus 100 receives the addition data input by the user for the addition target presented in step S2403. After the reception, the addition data input unit 2203 stores the received addition data in the operation result storage unit 2204. In the example illustrated in FIG. 18B, the server 2340 receives the addition data added on the clients 2351 to 2356 from the clients 2351 to 2356. The addition data is data containing annotation information such as a name and an explanation of an object contained in the addition target. Thereafter, the addition data input unit 2203 starts an addition data reception event.

Next, details of the process illustrated in FIG. 19B will be described below.

In step S2411, in response to the addition data reception event started in step S2404, the reference mismatch determination unit 2205 of the information processing apparatus 100 determines whether the reference check flag of the addition target to which the addition data is added is True. In a case where the reference check flag is True (YES in step S2411), the processing proceeds to step S2412. On the other hand, in a case where the reference check flag is False (NO in step S2411), the process ends. For example, in a case where the addition targets managed by the addition target management unit 2201 are as illustrated in FIG. 20, it can be checked that the reference check flag of the addition target with the ID 007 is True.

In step S2412, the reference mismatch determination unit 2205 of the information processing apparatus 100 acquires all the addition data added to the addition target with the reference check flag set to True from the operation result storage unit 2204. Specifically, the information processing apparatus 100 acquires the annotations added to the same addition target by the plurality of operators.

FIG. 22 illustrates an example of addition data managed by the operation result storage unit 2204. The addition data is managed in an addition data storage table 2700. The addition data storage table 2700 contains four columns. Further, each addition data is represented by a single row of the addition data storage table 2700. A column 2701 stores IDs for identifying the addition data. A column 2702 stores the addition data input by the operators. A column 2703 stores IDs of the addition targets to which the addition data is added. Since the addition targets are images in the example illustrated in FIG. 22, the image IDs are displayed, but the addition target is not limited to an image and can be a moving image, a character string that forms a natural language such as a sentence, or a file. A column 2704 stores IDs of the operators by which the addition data is input.

Results of the operations that are partly performed by the respective operators on the operation queues 2611 to 2616 illustrated in FIG. 21 are illustrated in FIG. 22. For example, in a case where the ID of the addition target with the reference check flag set to True that is described in step S2411 is 007, the addition data of the ID 007 in the column 2703 is acquired in step S2412 using the addition data storage table 2700 illustrated in FIG. 22. Specifically, in step S2412, the information processing apparatus 100 acquires six pieces of addition data with the IDs 007, 009, 010, 011, 014, and 015 stored in the column 2701.

In step S2413, the reference mismatch determination unit 2205 of the information processing apparatus 100 determines whether the number of pieces of addition data acquired in step S2412 and the number of operators are equal. In a case where the numbers are equal (YES in step S2413), the processing proceeds to step S2414. On the other hand, in a case where the numbers are not equal (NO in step S2413), the process ends.

In step S2414, the reference mismatch determination unit 2205 of the information processing apparatus 100 checks whether there is a variation between the plurality of pieces of addition data acquired in step S2412. If the reference is correctly shared, the addition data should match. Thus, in a case where the plurality of pieces of addition data contains a plurality of types of addition data, it is determined that there is a variation. Specifically, in a case where the comparison result of the annotations added to the same addition target by the plurality of operators indicates that the annotations added by the plurality of operators are not standardized, the information processing apparatus 100 determines that there is a variation in the addition reference between the plurality of operators. A variation determination method is not limited to that described above. In another method, an entropy of the plurality of pieces of addition data is calculated, and in a case where the calculated entropy is greater than or equal to a predetermined value, it can be determined that there is a variation. In a case where there is a variation (YES in step S2414), the processing proceeds to step S2415. On the other hand, in a case where there is not a variation (NO in step S2414), the process ends.

In step S2415, the warning display unit 2206 of the information processing apparatus 100 displays a warning to the operators, the inspector, and/or the supervisor. The information processing apparatus 100 can display a message as the attention attraction or the warning on the monitor 110 or can produce a sound as the attention attraction or the warning. Further, the information processing apparatus 100 can transmit information for outputting the warning to the apparatuses corresponding to the operators, the inspector, and/or the supervisor. Further, the information processing apparatus 100 can display the warning on the apparatuses corresponding to the operators, the inspector, and/or the supervisor.

The information processing apparatus 100 can present information indicating that there is a possibility of a difference or a variation in the addition reference between the plurality of operators as the attention attraction or the warning to the operators, the inspector, and/or the supervisor. Further, the information processing apparatus 100 can present information for prompting the user to standardize the addition reference as the attention attraction or the warning to the operators, the inspector, and/or the supervisor. In this case, the information processing apparatus 100 can email information indicating the warning to the corresponding address.

Further, in a case where only some of the operators add an annotation of a content different from those of the other operators, the information processing apparatus 100 may present the warning only to the some of the operators. In this case, the information processing apparatus 100 may provide the warning by presenting information that prompts the user to check the addition reference, information that indicates that an annotation of a content different from those of the other operators is added, and/or information indicating an annotation that is added by the other operators and is considered correct. Further, the information processing apparatus 100 may provide the warning to all the apparatuses of the system. Further, the information processing apparatus 100 may provide a combination of two or more of the attention attractions and the warnings that are described above as examples.

Further, in a case where the information processing apparatus 100 operates as the server 2340 in FIGS. 18A and 18B, the information processing apparatus 100 can transmit information for outputting the warning to the clients 2351 to 2356 corresponding to the operators, the inspector, and/or the supervisor as a warning target. Further, in a case where the information processing apparatus 100 operates as the server 2340, the information processing apparatus 100 can cause the monitor 110, which is built in or connected, to output the warning. Further, in a case where the information processing apparatus 100 operates as the clients 2351 to 2356, the information processing apparatus 100 can output the warning in response to reception of information for outputting the warning from the server 2340. Further, in a case where the information processing apparatus 100 operates as the clients 2351 to 2356, the information processing apparatus 100 can determine whether the addition reference of the operator corresponding to the information processing apparatus 100 is different from those of the other operators. In this case, annotations added by the other operators are received from the server 2340 or the other clients. Then, the information processing apparatus 100 determines whether the addition reference of the operator corresponding to the information processing apparatus 100 is different from those of the other operators, and the information processing apparatus 100 provides a warning that the addition reference of the operator corresponding to the information processing apparatus 100 is different from those of the other operators.

By the above-described process, the operator, the inspector, or the supervisor having checked the warning can recognize that the reference for annotation differs between the operators. In a case where the situation where the reference differs is recognized, the operator can re-check the recognition of the operator, or the inspector or the supervisor can directly instruct the operator having added an incorrect annotation due to a misunderstanding of the reference. As a result of the checking or instructing, the recognition with respect to the reference is corrected, and the annotation addition accuracy of the entire workplace increases.

A fourth exemplary embodiment in which a variation in the addition reference between the operators is determined and a warning is provided will be described below as another exemplary embodiment. A hardware configuration of the information processing apparatus 100 according to the fourth exemplary embodiment is similar to that in the first exemplary embodiment. Further, a functional configuration of the information processing apparatus 100 according to the fourth exemplary embodiment is similar to that in the third exemplary embodiment illustrated in FIG. 17, but a determination process by the reference mismatch determination unit 2205 is different from that in the third exemplary embodiment. Only this point will be described below.

Figure 23:
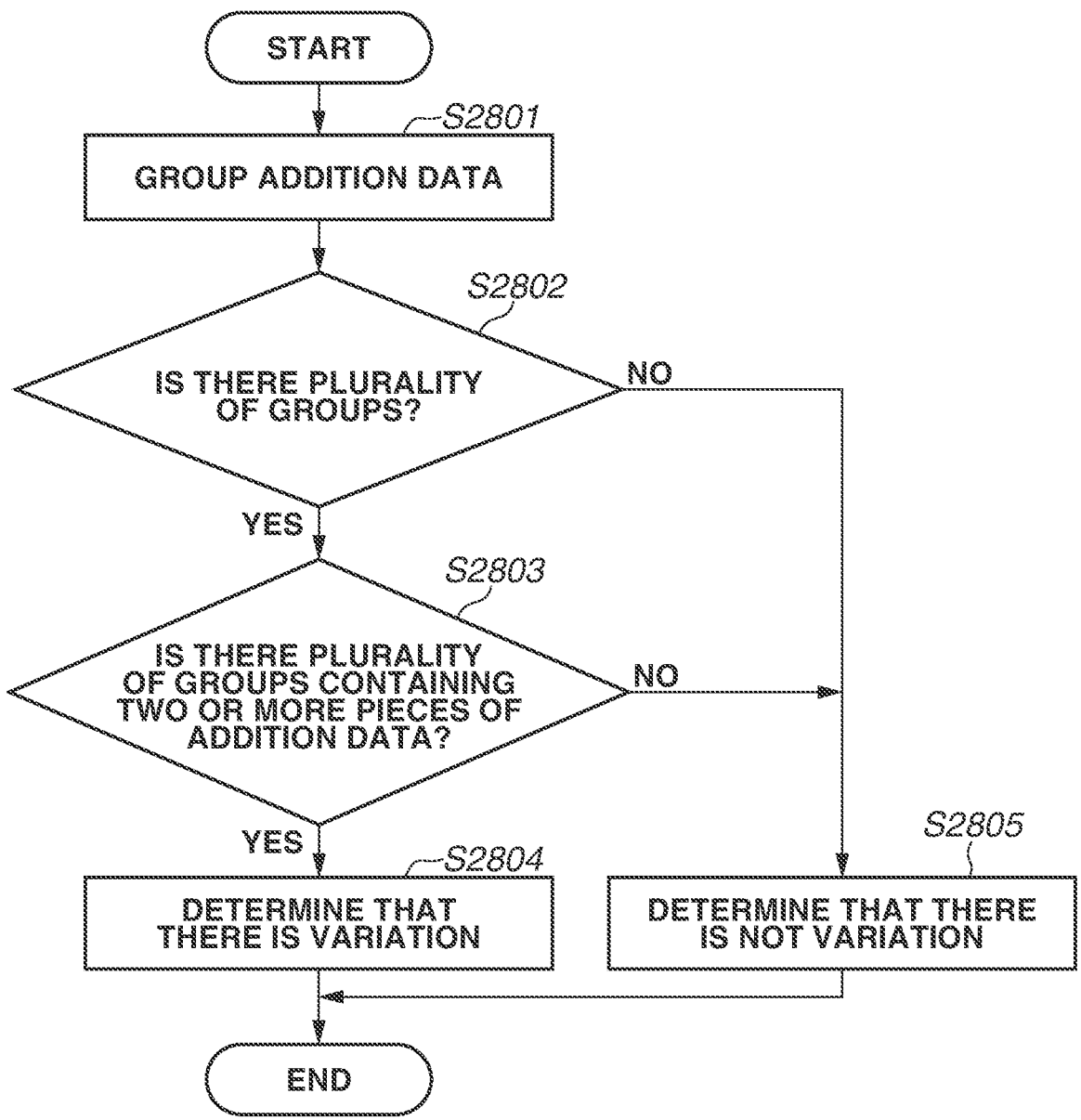
FIG. 23 is a flowchart illustrating a process of determining a variation between addition data added by a plurality of persons according to one embodiment.

In the fourth exemplary embodiment, a plurality of pieces of addition data is grouped to determine a variation. A variation determination process according to the fourth exemplary embodiment will be described below with reference to a flowchart illustrated in FIG. 23.

In step S2801, the reference mismatch determination unit 2205 of the information processing apparatus 100 groups the plurality of pieces of addition data. The case where the ID of the addition target is 007, which is also described above in the third exemplary embodiment, will be described below as an example. In the example illustrated in FIG. 22, six operators add addition data to the addition target with the ID 007. Specifically, there are six addition data IDs that are 007, 009, 010, 011, 014, and 015. According to the column 2702 of the six pieces of data, the addition data corresponding to each of the three IDs 007, 009, and 011 is "SUV", and the addition data corresponding to each of the three IDs 010, 014, and 015 is "pickup truck". In this case, the plurality of pieces of addition data is divided into two groups that are a sports utility vehicle (SUV) group and a pickup truck group. As described above, the grouping in the present exemplary embodiment refers to the separation based on the content of annotation.

In step S2802, the reference mismatch determination unit 2205 of the information processing apparatus 100 determines whether there is a plurality of groups as a result of the grouping in step S2801. In a case where the reference mismatch determination unit 2205 determines that there is a plurality of groups (YES in step S2802), the processing proceeds to step S2803. On the other hand, in a case where the reference mismatch determination unit 2205 determines that there is not a plurality of groups (NO in step S2802), the processing proceeds to step S2805. In the above-described example, two groups that are the SUV group and the pickup truck group are generated, so that the processing proceeds to step S2803.

In step S2803, the reference mismatch determination unit 2205 of the information processing apparatus 100 determines whether there is a plurality of groups containing two or more pieces of addition data. This is to consider the possibility of a mistake by an operator in a case where a group contains less than two pieces of addition data, i.e., the group contains a single piece of addition data. In a case where the reference mismatch determination unit 2205 determines that there is a plurality of groups (YES in step S2803), the processing proceeds to step S2804. On the other hand, in a case where the reference mismatch determination unit 2205 determines that there is not a plurality of groups (NO in step S2803), the processing proceeds to step S2805. In the above-described example, the SUV group and the pickup truck group each contain three pieces of addition data, so that the processing proceeds to step S2804. While the determination is based on whether the number of pieces of addition data in each group is two or more in the present exemplary embodiment, the number is not limited to two. In a case where a greater number is desired for the determination as a mere mistake by an operator, a value that is greater than or equal to two can be set.

In step S2804, the reference mismatch determination unit 2205 of the information processing apparatus 100 determines that there is a variation between the addition data.

In step S2805, the reference mismatch determination unit 2205 of the information processing apparatus 100 determines that there is not a variation between the addition data.

By the above-described process, the possibility of a mere mistake by an operator can be eliminated, so that a difference in the reference is detected with high certainty.

Figure 24:
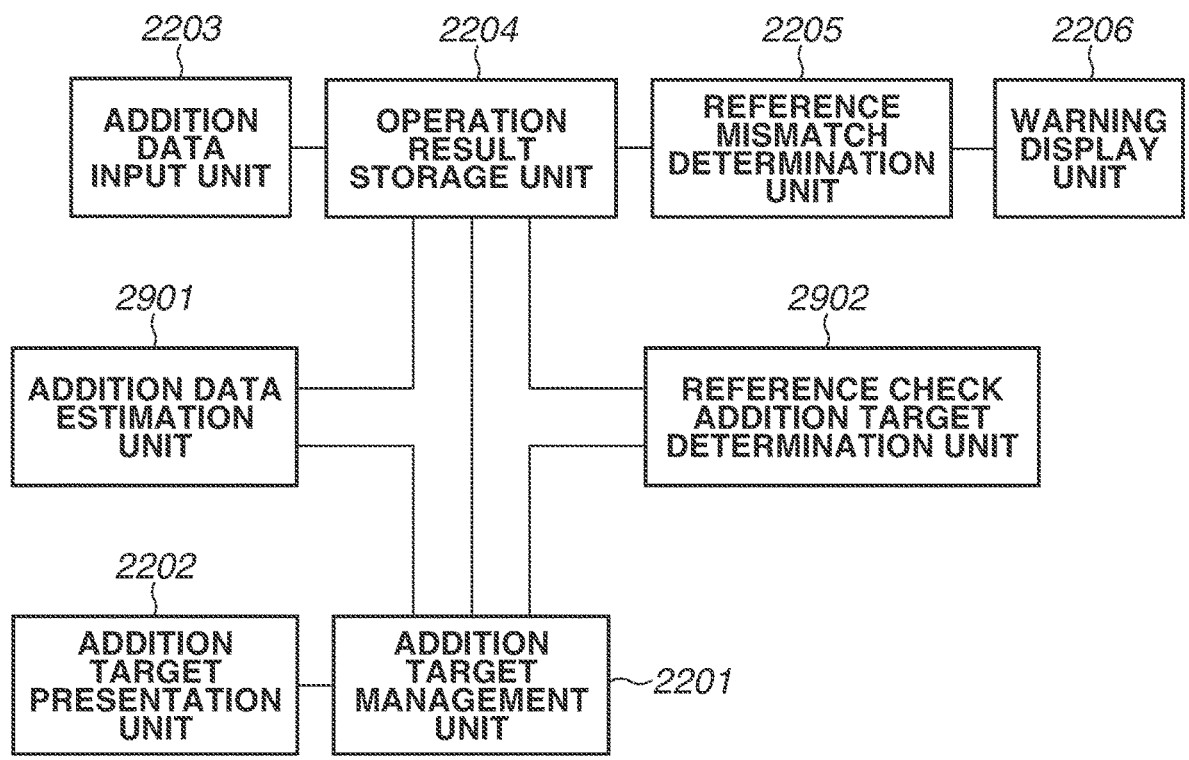
FIG. 24 is a diagram illustrating a functional configuration of an information processing apparatus according to one embodiment.

A fifth exemplary embodiment in which a variation in the addition reference between the operators is determined and a warning is provided will be described below as another exemplary embodiment. A hardware configuration of the information processing apparatus 100 according to the fifth exemplary embodiment is similar to that in the first exemplary embodiment. Further, a functional configuration of the information processing apparatus 100 according to the fifth exemplary embodiment is illustrated in FIG. 24. Each component similar to that in the third exemplary embodiment illustrated in FIG. 17 is given a reference number that is the same as that in FIG. 17, and redundant descriptions thereof are omitted.

An addition data estimation unit 2901 pre-estimates addition data to be added to the addition targets managed by the addition target management unit 2201. For the estimation, a pre-trained model is generated by machine learning of a relationship between an addition target of the same type as the addition target managed by the addition target management unit 2201 and addition data to be added to the addition target of the same type. Then, addition data to be added is estimated using the pre-trained model for each addition target managed by the addition target management unit 2201. The estimated addition data is stored as estimation addition data in association with the addition target in the operation result storage unit 2204.

The pre-trained model for use by the addition data estimation unit 2901 can be acquired by execution of machine learning by the information processing apparatus 100 or can be acquired by externally acquiring a trained model generated by machine learning. In a case where the information processing apparatus 100 executes machine learning, the information processing apparatus 100 can further include a GPU to execute machine learning using the GPU in addition to the CPU 101. The GPU is effective in a case where learning is executed a plurality of times as in deep learning because more data can be processed in parallel to realize efficient computation.

Specific algorithms of machine learning are a nearest neighbor algorithm, a naive Bayes algorithm, a decision tree, and a support vector machine. Another specific algorithm is deep learning that by itself generates a feature amount and a connection weight coefficient for learning using a neural network. An algorithm that can be used among the above-described algorithms is used and applied to the present exemplary embodiment as needed.

To generate a trained model, a plurality of combinations of input data and output data is prepared as training data (supervisory data). Machine learning is executed using the training data to acquire knowledge, and a trained model that outputs output data corresponding to input data as a result is generated based on the acquired knowledge. The trained model can be updated after a predetermined process as needed.

The addition target of the same type in a case where, for example, the operator checks a car in an image and adds the type of the car as addition data is an image that is different from the image managed by the addition target management unit 2201 and contains the car. Further, the estimation addition data contains a result of the estimation using the pre-trained model and a probability thereof. An example of estimation addition data will be described below with reference to FIGS. 25A and 25B. In the examples illustrated in FIGS. 25A and 25B, an image is described as an addition target.

An estimation addition data storage table 21000 illustrated in FIG. 25A contains five columns. Further, each estimation addition data is represented by a single row of the estimation addition data storage table 21000. A column 21001 stores IDs for identifying estimation addition data as estimation results. A column 21002 stores the estimation results. A column 21003 stores certainty information about the estimation results. A column 21004 stores IDs of images that are estimation targets. A column 21005 stores IDs of regions contained in the images that are estimation targets. The regions are managed by a region table 21010 described below. Since there are cases where a plurality of pieces of addition data is added to an addition target, the region information is stored. For example, in a case where the type of a vehicle in an image is to be added as an annotation and there is a plurality of vehicles in the image, a region in the image is designated, and the annotation is added to the designated region. In the example illustrated in FIG. 25A, the two pieces of estimation addition data with the IDs 008 and 009 are added to the addition target of the image ID 008 of the column 21004.

The region table 21010 illustrated in FIG. 25B contains five columns. Further, each region in the addition target is represented by a single row of the region table 21010. A column 21011 stores IDs for identifying the regions. A column 21012 stores values of X-coordinates of start points that are the upper left points of the regions. A column 21013 stores values of Y-coordinates of the start points that are the upper left points of the regions. A column 21014 stores values of the widths of the regions. A column 21015 stores values of the heights of the regions.

Figure 26:
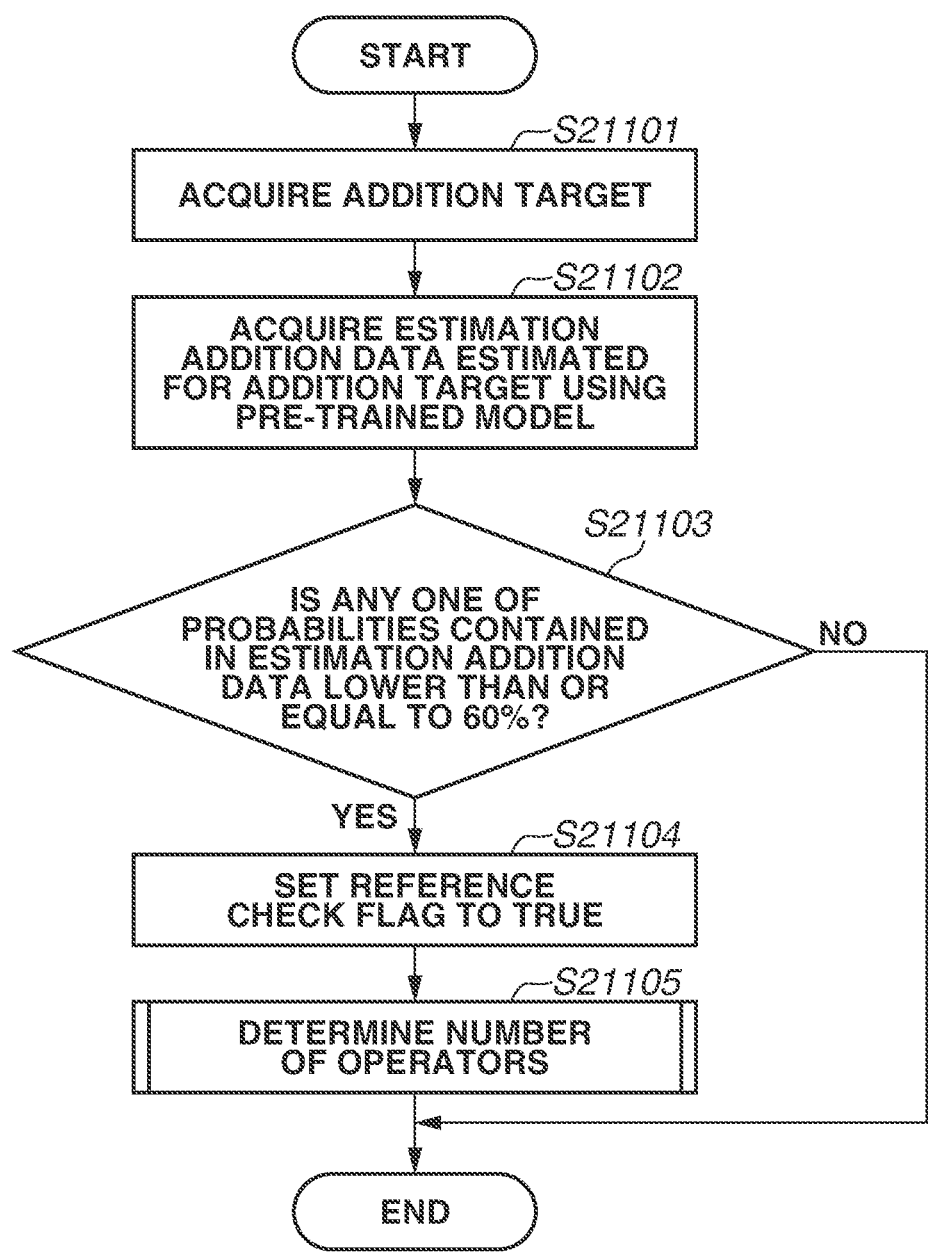
FIG. 26 is a flowchart illustrating a process of determining a reference check addition target according to one embodiment.

A reference check addition target determination unit 2902 determines a reference check addition target suitable for use in determining whether there is a difference in the reference. A process of determining a reference check addition target will be described below with reference to a flowchart in FIG. 26.

In step S21101, the reference check addition target determination unit 2902 of the information processing apparatus 100 acquires one addition target from the addition target management unit 2201.

In step S21102, the reference check addition target determination unit 2902 of the information processing apparatus 100 acquires all the estimation addition data estimated for the addition target acquired in step S21101 from the operation result storage unit 2204.

In step S21103, the information processing apparatus 100 determines a difficulty in operating the addition target based on the one or more pieces of estimation addition data acquired in step S21102. In the present exemplary embodiment, whether any one of the probabilities contained in the one or more pieces of estimation addition data is lower than or equal to 60% is determined. In a case where the information processing apparatus 100 determines that there is estimation addition data containing the probability that is lower than or equal to 60% (YES in step S21103), the processing proceeds to step S21104. On the other hand, in a case where the information processing apparatus 100 determines that all the probabilities contained in the estimation addition data are higher than 60% (NO in step S21103), the process ends. The value of 60% is a mere example, and the threshold value is not limited to 60% and can be set to any desired value.

Further, in a case where the certainty of the estimation addition data is to be used, a different value that is preset by the user can be used, or a trend of probabilities contained in the estimation addition data group managed by the operation result storage unit 2204 can be used. The use of the trend of the probabilities is, for example, use of an average of the probabilities. Other information can be used without using the certainty information about the estimation addition data. For example, the number of pieces of estimation addition data contained in one addition target can be used, or in a case where the estimation addition data contains regions as illustrated in FIGS. 25A and 25B, the area of an overlap of the regions can be used.

Figure 27:
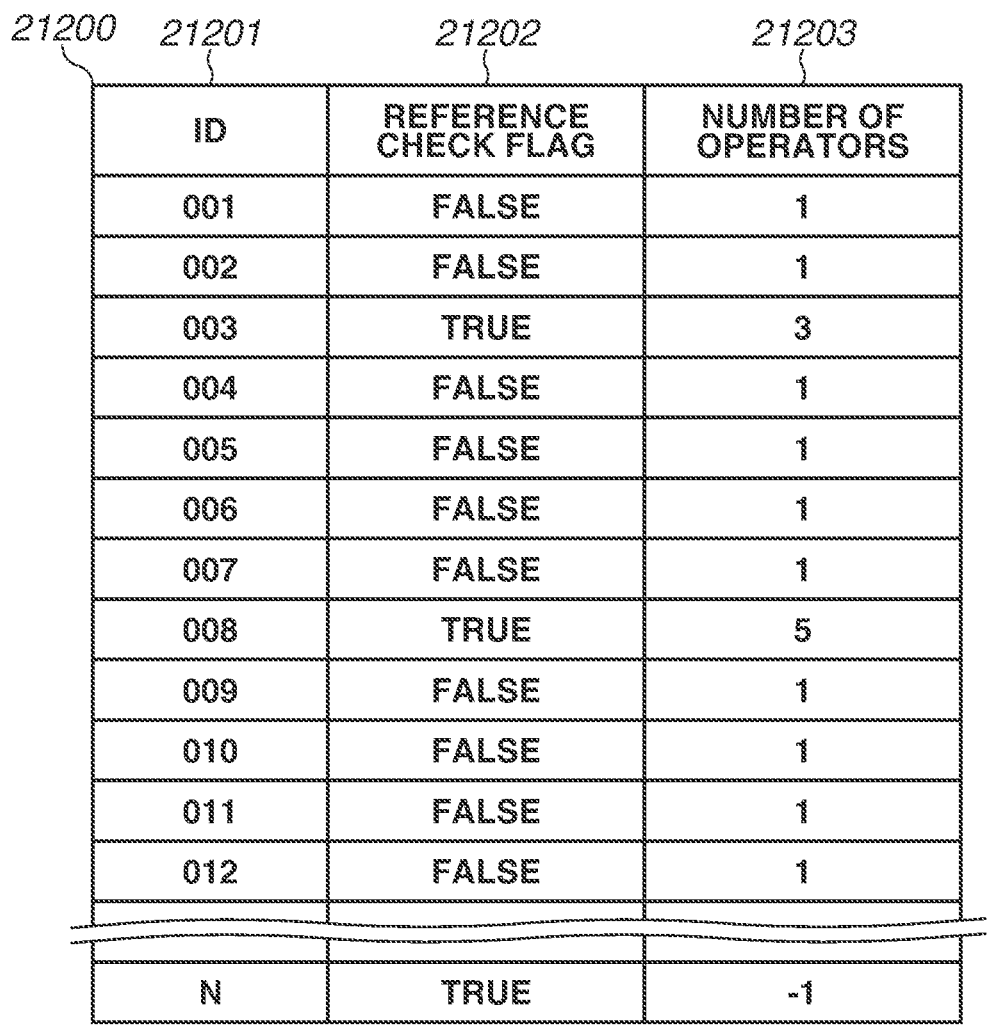
FIG. 27 is a diagram illustrating an example of a table that manages addition targets according to one embodiment.

In step S21104, the reference check addition target determination unit 2902 of the information processing apparatus 100 sets the concentration determination flag to the corresponding addition target. The concentration determination flag can be set as a column of a database managed by the addition target management unit 2201, or in a case where an addition target is a file, the concentration determination flag can be added as metadata of the file. FIG. 27 illustrates an example of addition targets managed by the addition target management unit 2201.

An addition target storage table 21200 illustrated in FIG. 27 contains three columns. Further, each addition target is represented by a single row of the addition target storage table 21200. A column 21201 stores IDs for identifying the addition targets. A column 21202 stores information indicating whether the corresponding addition target is suitable for use as the reference check addition target. A column 21203 stores the number of operators to present the addition target in a case where the addition target is the reference check addition target. In a case where the value of the column 21202 is False, the value of the column 21203 is one. In a case where the value of the column 21202 is True, a value other than one is stored as the value of the column 21203. The value of the column 21203 that is greater than one indicates that the addition target is to be presented to operators of the number that is equal to the value of the column 21203. On the other hand, the value of the column 21203 that is a negative value indicates that the addition target is to be presented to all the operators.

In step S21105, the reference check addition target determination unit 2902 of the information processing apparatus 100 determines the number of operators to present the reference check addition target. This process will be described below with reference to FIG. 28. Alternatively, the reference check addition target can always be presented to all the operators without executing step S21105.

Steps S21101 to S21105 are executed on each addition target, and the reference check addition target determination unit 2902 executes steps S21101 to S21105 on every one of the addition targets managed by the addition target management unit 2201.

The process of determining the number of operators to present the reference check addition target will be described below with reference to FIG. 28.

In step S21301, the reference check addition target determination unit 2902 of the information processing apparatus 100 determines whether the lowest probability of the estimation addition data among the estimation addition data for the processing target addition target is lower than 60% and not lower than 50%. In a case where the reference check addition target determination unit 2902 determines that the above-described condition is satisfied (YES in step S21301), the processing proceeds to step S21302. On the other hand, in a case where the reference check addition target determination unit 2902 determines that the above-described condition is not satisfied (NO in step S21301), the processing proceeds to step S21303.

In step S21302, the reference check addition target determination unit 2902 of the information processing apparatus 100 determines that the number of operators to present the reference check addition target is three and sets the value of three to the addition target management unit 2201. Specifically, the value of three is set to the column 21203 of the addition target storage table 21200 in FIG. 27.

In step S21303, the reference check addition target determination unit 2902 of the information processing apparatus 100 determines whether the lowest probability of the estimation addition data among the estimation addition data for an addition target is lower than 50% and not lower than 40%. In a case where the reference check addition target determination unit 2902 determines that the above-described condition is satisfied (YES in step S21303), the processing proceeds to step S21304. On the other hand, in a case where the reference check addition target determination unit 2902 determines that the above-described condition is not satisfied (NO in step S21303), the processing proceeds to step S21305.

In step S21304, the reference check addition target determination unit 2902 of the information processing apparatus 100 determines that the number of operators to present the reference check addition target is five and sets the value of five to the addition target management unit 2201. Specifically, the value of five is set to the column 21203 of the addition target storage table 21200 in FIG. 27.

In step S21305, the reference check addition target determination unit 2902 of the information processing apparatus 100 determines that the number of operators to present the reference check addition target is the number of all the operators and sets the number to the addition target management unit 2201. Specifically, the value of minus one is set to the column 21203 of the addition target storage table 21200 in FIG. 27.

Figure 28:
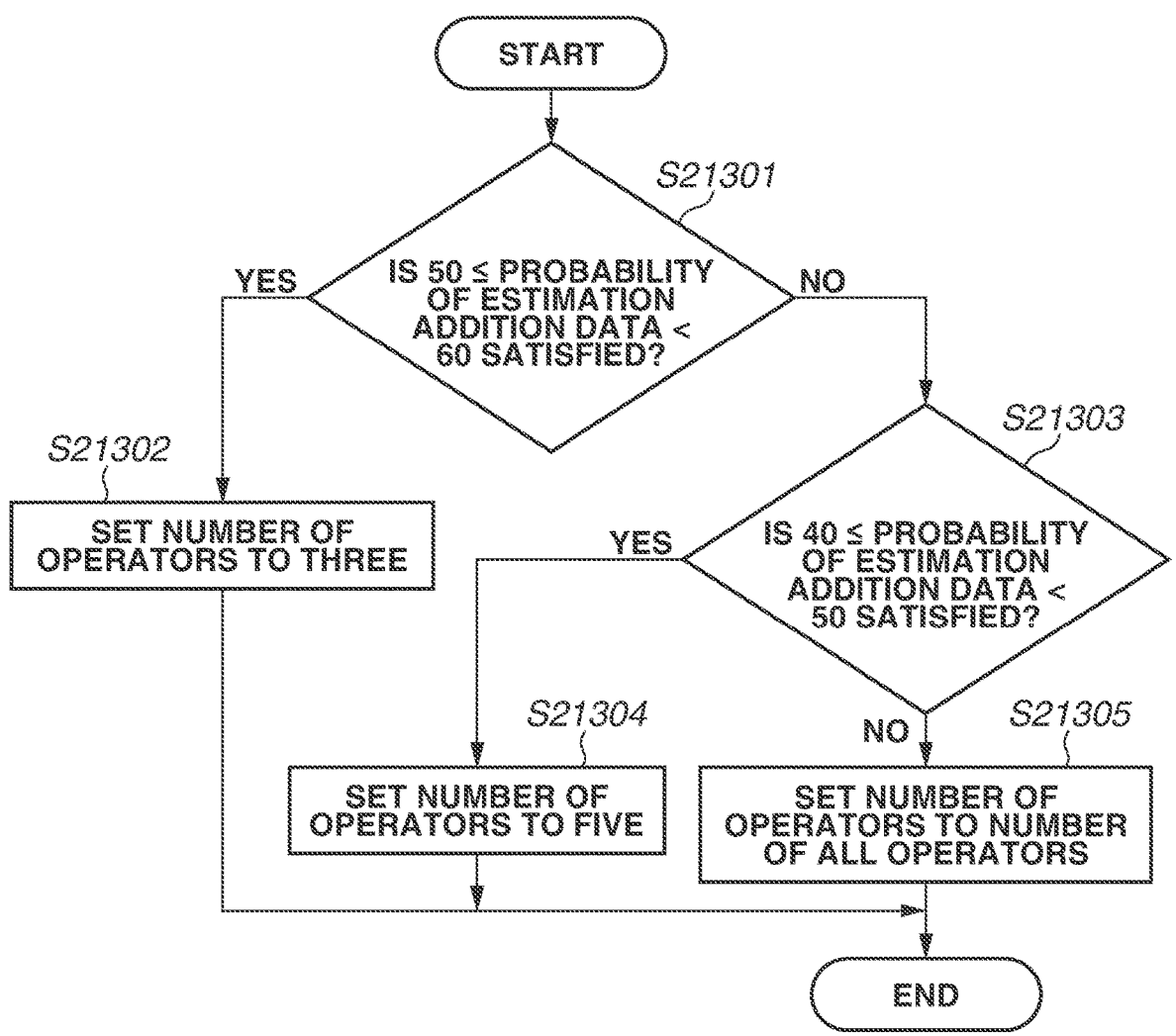
FIG. 28 is a flowchart illustrating a process of determining the number of operators to operate the same addition target according to one embodiment.

The number of branches of the probabilities and determinations designated in the process in FIG. 28 is not limited to that illustrated therein. While there are three branches that are lower than 60% and not lower than 50%, lower than 50% and not lower than 40%, and lower than 40% in the present exemplary embodiment, the range of 60% to 40% can be divided by 5% into four divisions, and an additional range that is lower than 40% is added to obtain the five divisions. Alternatively, the range can be divided into two divisions that are lower than 60% and not lower than 40%, and lower than 40%. Further, other information can be used without using the certainty information about the estimation addition data as in step S21103. For example, the range of the number of pieces of estimation addition data contained in one addition target can be used, or in a case where the estimation addition data contains regions as illustrated in FIGS. 25A and 25B, the range of the area of an overlap of the regions or the range of the number can be used. Further, a method of using a database in managing the number of operators to present an addition target is a mere example, and the method is not limited to that described above. For example, in a case where an addition target is a file, the concentration determination flag can be added as metadata of the file.

While the number of operators as a target of checking the addition reference is changed based on the estimation certainty of the annotation of the addition target, the number is not limited to that described above and can be constant (e.g., all the operators) regardless of the estimation certainty.

Next, FIG. 29 illustrates an example in which an operation queue for each operator is set at the addition target management unit 2201 in a case where a reference determination addition target is identified using the estimation addition data and the number of operators to present the reference determination addition target is determined.

The example illustrated in FIG. 29 is an example of operation queues in a case where the number of operators is six as in FIG. 21. Queues 21401, 21402, 21403, 21404, 21405, and 21406 respectively are for operators A, B, C, D, E, and F. The six queues 21401 to 21406 are to be used in this order from the top.

The addition target management unit 2201 sets an addition target to the queues based on the reference check flags stored in the column 21202 and the number of operators stored in the column 21203 in the addition target storage table 21200 in FIG. 27.

A method of assigning the addition targets illustrated as an example in FIG. 27 to the queues 21401 to 21406 by the addition target management unit 2201 will be described below. In the present exemplary embodiment, the method will be described in ascending order of the IDs in the column 21201. The addition target of the ID 001 is assigned to one operator because the reference check flag is set to False. Specifically, the addition target of the ID 001 is assigned to the queue 21401. Then, similarly, the addition target with the ID 002 is assigned to the queue 21402. The addition target with the ID 003 is assigned to the queues 21403, 21404, and 21405 because the reference check flag is set to True and the number of operators to present is three. The four addition targets with the IDs 004 to 007 are sequentially assigned to the queues 21406, 21401, 21402, and 21403 because the reference check flag is set to False. Then, the addition target with the ID 008 is assigned to the queues 21404, 21405, 21406, 21401, and 21402 because the reference check flag is set to True and the number of operators to present is five. The four addition targets with the IDs 009 to 012 are sequentially assigned to the queues 21403, 21404, 21405, and 21406 because the reference check flag is set to False. Skipping to the end, the addition target with the ID N is assigned to all the operators because the reference check flag is set to True and the number of operators to present is minus one. Specifically, the addition target with the ID N is assigned to all the queues 21401, 21402, 21403, 21404, 21405, and 21406.

By the above-described process, the determination of whether there is a difference in the reference is limitedly performed with respect to an addition target that is likely to differ in the reference. As a result, whether there is a difference in the reference is detected more efficiently, and the accuracy of the annotation addition in the entire workplace increases efficiently.

According to the present exemplary embodiment, with the above-described configuration, a warning is provided based on a variation in the results of addition of annotations by a plurality of operators. Thus, the operator or the supervisor having recognized the warning or the inspector inspecting the addition results can promptly recognize what addition target is likely to cause a difference in the reference and which operator has a variation in recognition. This makes it possible to encourage the operator having the variation in recognition of the addition reference to take an action to recover, so that the entire annotation addition accuracy improves.

Other Exemplary Embodiments

The above-described exemplary embodiments can be combined as needed. For example, the first and second exemplary embodiments can be combined, and the processes of determining a decrease in concentration according to the first and second exemplary embodiments can be switched at every predetermined number of times. Alternatively, the processes of determining a decrease in concentration according to the first and second exemplary embodiments can be randomly switched. For example, the processes of determining the addition reference according to the respective exemplary embodiments can be switched at every predetermined number of times. Alternatively, the processes according to the respective exemplary embodiments can be randomly switched.

Further, while the information processing apparatus 100 is configured to determine a decrease in concentration in the above-described exemplary embodiments, the configuration is not limited to those described above. For example, the determination in step S804 can be the determination of whether there is a decrease in recognition accuracy of an operator. Specifically, the above-described exemplary embodiments can detect not only a decrease in concentration but also a decrease in recognition accuracy caused by, for example, a decrease in eyesight due to eye strain of the operator and can provide a warning and an attention attraction about the detected decrease.

Various embodiments of the present disclosure can also be realized by a process in which a program for realizing one or more functions of the above-described exemplary embodiments is fed to a system or an apparatus via a network or a storage medium and one or more processors of a computer of the system or the apparatus read the program and execute the read program. Further, various embodiments can also be realized by a circuit (e.g., application-specific integrated circuit (ASIC)) that realizes one or more functions.

Other Embodiments

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-103338, filed Jun. 15, 2020, and No. 2020-103339, filed Jun. 15, 2020, which are hereby incorporated by reference herein in their entireties.

What is claimed is:

1. An information processing apparatus comprising:
one or more processors; and
one or more memories storing instructions that, when executed by the one or more processors cause the information processing apparatus to functions as:
an acquisition unit configured to acquire a first annotation that is for an addition target and is based on input from a human operator;
a comparison unit configured to compare the first annotation acquired by the acquisition unit and a second annotation, for the addition target, whose annotation certainty is greater than or equal to a first threshold, estimated using a trained model generated by machine learning, wherein the estimation is performed to the addition target;
a determination unit configured to determine whether there is a decrease in accuracy of annotation of the human operator based on the comparison by the comparison unit; and
a warning unit configured to provide a warning in a case where the determination unit determines that there is a decrease in accuracy of annotation of the human operator,
wherein the determination is executed by the determination unit in a case where a predetermined time has elapsed since last execution of the determination by the determination unit and in addition where an operation time of adding the annotation of the human operator is longer than a threshold.

2. The information processing apparatus according to claim 1, wherein in a case where a result of the comparison by the comparison unit indicates that the first annotation and the second annotation do not match, the determination unit determines that there is a decrease in recognition accuracy of the operator.

3. The information processing apparatus according to claim 1, further comprising an estimation unit configured to estimate the annotation for the addition target,
wherein the second annotation is an annotation estimated by the estimation unit.

4. The information processing apparatus according to claim 3, wherein the estimation unit estimates the annotation for the addition target using a trained model generated by machine learning.

5. The information processing apparatus according to claim 3, wherein the second annotation is an annotation with a certainty of the estimation by the estimation unit, the certainty being greater than or equal to a first threshold value.

6. The information processing apparatus according to claim 1, further comprising a second determining unit configured to determine a timing to execute the determination by the determination unit.

7. The information processing apparatus according to claim 1, wherein in a case where a result of the comparison by the comparison unit indicates that the first annotation and the second annotation are added to different regions, the determination unit determines that there is a decrease in recognition accuracy of the operator.

8. The information processing apparatus according to claim 1, wherein the determination unit determines that the accuracy of annotation has not decreased in a case where the first annotation is a synonym of the second annotation.

9. A method comprising:
acquiring a first annotation that is for an addition target and is based on input from a human operator;
comparing the first annotation acquired by the acquiring and a second annotation, for the addition target, whose annotation certainty is greater than or equal to a first threshold, estimated using a trained model generated by machine learning, wherein the estimation is performed to the addition target;
determining whether there is a decrease in accuracy of annotation of the human operator based on the comparison by the comparing; and providing a warning in a case where the determining determines that there is a decrease in accuracy of annotation of the human operator, wherein the determining is executed in a case where a predetermined time has elapsed since last execution of the determining and in addition where an operation time of adding the annotation of the human operator is longer than a threshold.

10. A non-transitory computer readable storage medium storing instructions for an information processing apparatus to perform a process, the process comprising:

acquiring a first annotation that is for an addition target and is based on input from a human operator;

comparing the first annotation acquired by the acquiring and a second annotation, for the addition target, whose annotation certainty is greater than or equal to a first threshold, estimated using a trained model generated by machine learning, wherein the estimation is performed to the addition target;

determining whether there is a decrease in accuracy of annotation of the human operator based on the comparison by the comparing; and providing a warning in a case where the determining determines that there is a decrease in accuracy of annotation of the human operator, wherein the determining is executed in a case where a predetermined time has elapsed since last execution of the determining and in addition where an operation time of adding the annotation of the human operator is longer than a threshold.

* * * * *